US012514560B2

(12) United States Patent
McLaughlin et al.

(10) Patent No.: US 12,514,560 B2
(45) Date of Patent: *Jan. 6, 2026

(54) REGIONAL ULTRASOUND SPEED MAP GENERATION

(71) Applicant: Shenzhen Mindray Bio-Medical Electronics Co., Ltd., Shenzhen (CN)

(72) Inventors: Glen W. McLaughlin, San Carlos, CA (US); David J. Napolitano, Pleasanton, CA (US)

(73) Assignee: SHENZHEN MINDRAY BIO-MEDICAL ELECTRONICS CO., LTD., Guangdong (CN)

( * ) Notice: Subject to any disclaimer, the term of this patent is extended or adjusted under 35 U.S.C. 154(b) by 73 days.

This patent is subject to a terminal disclaimer.

(21) Appl. No.: 18/367,267

(22) Filed: Sep. 12, 2023

(65) Prior Publication Data

US 2024/0057976 A1 Feb. 22, 2024

Related U.S. Application Data

(63) Continuation-in-part of application No. 17/862,124, filed on Jul. 11, 2022, now Pat. No. 11,751,852, (Continued)

(51) Int. Cl.
*A61B 8/08* (2006.01)
*A61B 8/00* (2006.01)

(52) U.S. Cl.
CPC .......... *A61B 8/5207* (2013.01); *A61B 8/5246* (2013.01); *A61B 8/5269* (2013.01)

(58) Field of Classification Search
CPC ... A61B 8/5207; A61B 8/5246; A61B 8/5269; A61B 8/469; A61B 8/587; A61B 8/5238
See application file for complete search history.

(56) References Cited

U.S. PATENT DOCUMENTS

| 5,218,869 A | 6/1993 | Pummer |
| 11,751,852 B2 | 9/2023 | McLaughlin et al. |

(Continued)

FOREIGN PATENT DOCUMENTS

| CN | 103142253 A | 6/2013 |
| CN | 105793729 A | 7/2016 |

(Continued)

OTHER PUBLICATIONS

Aing, A. C. et al., "The Force Attenuation Provided by Hip Protectors Depends on Impact Velocity, Pelvic Size, and Soft Tissue Stiffness," ASME. J Biomech Eng., Dec. 2008; 130(6): 061005. https://doi.org/10.1115/1.2979867.

*Primary Examiner* — Kaitlyn E Sebastian
(74) *Attorney, Agent, or Firm* — PV IP PC; Wei Te Chung

(57) ABSTRACT

A method includes collecting ultrasound information of a subject region, the ultrasound information including reflectivity information in response to ultrasound pulses; forming ultrasound images of a first region from the reflectivity information, the ultrasound images of the first region being formed using, within the first region, respective propagation speeds for the ultrasound pulses; applying a focus metric to the ultrasound images and determining thereby a first accumulated speed that is predicted to optimize the focus metric; forming the ultrasound images of a second region from the reflectivity information, the ultrasound images of the second region being formed using, within the second region, the respective propagation speeds for the ultrasound pulses; applying the focus metric to the ultrasound images of the second region and determining thereby a second accumulated speed that is predicted to optimize the focus metric; and generating a regional sound speed map based on the first accumulated speed and the second accumulated speed.

24 Claims, 18 Drawing Sheets

Related U.S. Application Data which is a continuation of application No. 16/792,762, filed on Feb. 17, 2020, now Pat. No. 11,452,504.

(60) Provisional application No. 62/827,984, filed on Apr. 2, 2019.

(56) References Cited

U.S. PATENT DOCUMENTS

| | | |
|---|---|---|
| 2004/0015079 A1 | 1/2004 | Berger et al. |
| 2009/0149750 A1 | 6/2009 | Matsumura |
| 2012/0108973 A1 | 5/2012 | Osumi |
| 2012/0245468 A1* | 9/2012 | Miyachi ............ G01S 7/52049 600/447 |
| 2013/0218012 A1 | 8/2013 | Specht et al. |
| 2014/0051984 A1 | 2/2014 | Berger et al. |
| 2014/0276049 A1 | 9/2014 | Doherty et al. |
| 2015/0313577 A1* | 11/2015 | Duric ................ A61B 8/5207 600/438 |
| 2016/0030000 A1 | 2/2016 | Sandhu et al. |
| 2016/0038123 A1* | 2/2016 | Duric ................ A61B 8/15 600/443 |
| 2017/0340310 A1 | 11/2017 | Carlini et al. |
| 2018/0008237 A1 | 1/2018 | Venkataraman et al. |
| 2019/0282200 A1 | 9/2019 | Choi et al. |
| 2021/0219941 A1 | 7/2021 | Tsutaoka |
| 2022/0401076 A1 | 12/2022 | McLaughlin et al. |

FOREIGN PATENT DOCUMENTS

| | | | |
|---|---|---|---|
| CN | 107427278 A | 12/2017 | |
| WO | WO-2018043193 A1 * | 3/2018 | ........... A61B 5/0095 |

* cited by examiner

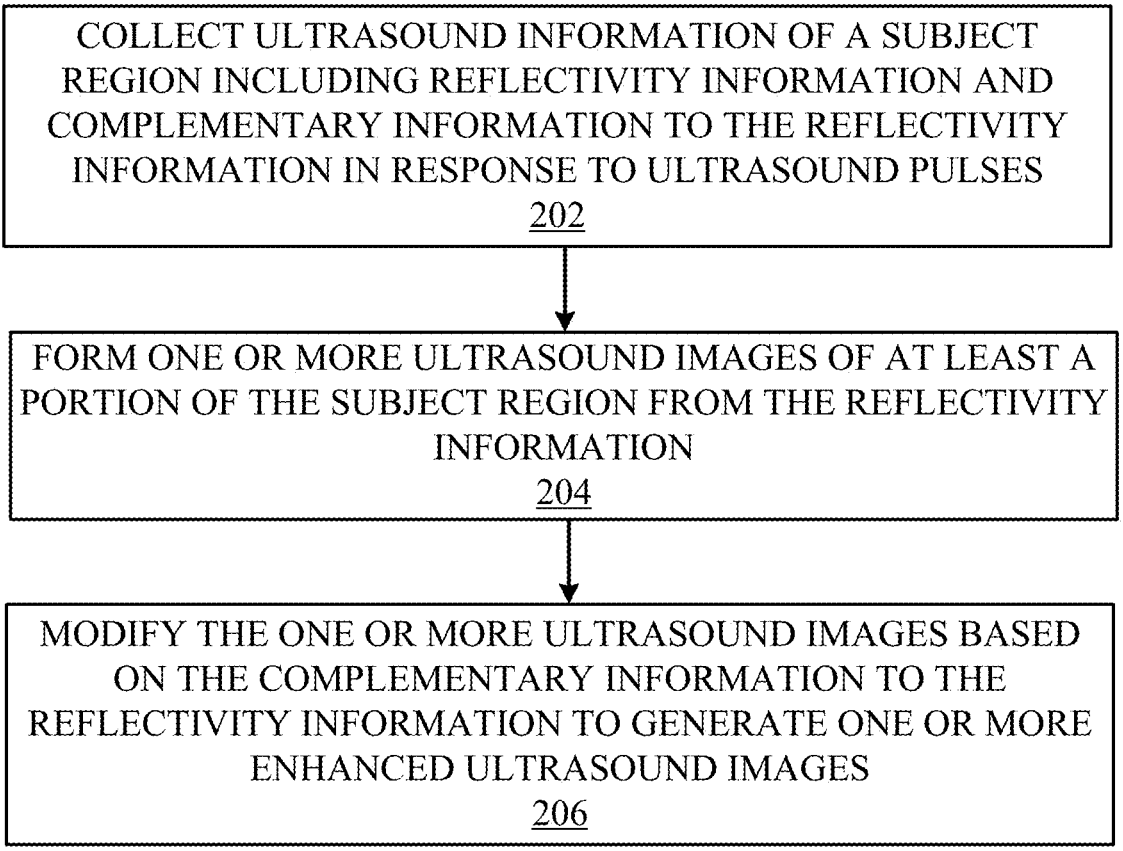

```
┌─────────────────────────────────────────────────┐
│   COLLECT ULTRASOUND INFORMATION OF A SUBJECT   │
│  REGION INCLUDING REFLECTIVITY INFORMATION AND  │
│    COMPLEMENTARY INFORMATION TO THE REFLECTIVITY│
│   INFORMATION IN RESPONSE TO ULTRASOUND PULSES  │
│                       202                       │
└─────────────────────────────────────────────────┘
                        │
                        ▼
┌─────────────────────────────────────────────────┐
│  FORM ONE OR MORE ULTRASOUND IMAGES OF AT LEAST A│
│  PORTION OF THE SUBJECT REGION FROM THE REFLECTIVITY│
│                   INFORMATION                   │
│                       204                       │
└─────────────────────────────────────────────────┘
                        │
                        ▼
┌─────────────────────────────────────────────────┐
│  MODIFY THE ONE OR MORE ULTRASOUND IMAGES BASED │
│    ON THE COMPLEMENTARY INFORMATION TO THE      │
│ REFLECTIVITY INFORMATION TO GENERATE ONE OR MORE│
│            ENHANCED ULTRASOUND IMAGES           │
│                       206                       │
└─────────────────────────────────────────────────┘
```

FIG. 2

REGIONAL ULTRASOUND SPEED MAP GENERATION

CROSS-REFERENCE TO RELATED APPLICATIONS

This application is a continuation-in-part of U.S. patent application Ser. No. 17/862,124 to Glen W. McLaughlin et al., titled REGIONAL CONTRAST ENHANCEMENT BASED ON COMPLEMENTARY INFORMATION TO REFLECTIVITY INFORMATION and filed Jul. 11, 2022, which is a continuation of U.S. patent application Ser. No. 16/792,762 to Glen W. McLaughlin et al., titled REGIONAL CONTRAST ENHANCEMENT BASED ON COMPLEMENTARY INFORMATION TO REFLECTIVITY INFORMATION and filed Feb. 17, 2020, which claims priority to U.S. Provisional Patent Application No. 62/827,984 to Glen W. McLaughlin et al., titled SOUND SPEED ESTIMATION FOR THE USE OF REGIONAL CONTRAST ENHANCEMENT OF GRAY SCALE IMAGES and filed Apr. 2, 2019, the entire disclosures of which are hereby incorporated herein by reference.

TECHNICAL FIELD

The present disclosure relates to ultrasound imaging and more particularly to modifying ultrasound images based on complementary information to reflectivity information.

BACKGROUND OF THE INVENTION

Ultrasound imaging is widely used for examining a wide range of materials and objects across a wide array of different applications. Ultrasound imaging provides a fast and easy tool for analyzing materials and objects in a non-invasive manner. As a result, ultrasound imaging is especially common in the practice of medicine as an ailment diagnosis, treatment, and prevention tool. Specifically, because of its relatively non-invasive nature, low cost and fast response time ultrasound imaging is widely used throughout the medical industry to diagnose and prevent ailments. Further, as ultrasound imaging is based on non-ionizing radiation it does not carry the same risks as other diagnosis imaging tools, such as X-ray imaging or other types of imaging systems that use ionizing radiation.

Ultrasound images typically suffer from limited contrast resolution as a number of clinically significant structures have similar echogenicity to that of background tissue. This limitation has resulted in physicians using other imaging modalities to more easily visualize the contrast resolution between healthy and diseased tissue. Several techniques have been developed in order to improve the overall contrast resolution of ultrasound images, e.g. for purposes of improving contrast resolution for background tissue having similar echogenicity. Specifically, techniques for compounding images of either different frequencies, different orientations, or different nonlinear tissue properties have been developed, e.g. harmonic imaging has been developed. While such techniques do provide improvements in contrast resolution in ultrasound images, the amount of contrast resolution capable of being achieved through these techniques is still deficient.

SUMMARY

According to various embodiments, a method for performing ultrasound imaging includes collecting ultrasound information of a subject region in response to ultrasound pulses transmitted toward the subject region. The ultrasound information can include both reflectivity information and complementary information to the reflectivity information of the subject region in response to the ultrasound pulses. The method can also include forming one or more ultrasound images of at least a portion of the subject region from the reflectivity information. Further, the method can include modifying the one or more ultrasound images based on the complementary information to the reflectivity information to generate one or more enhanced ultrasound images from the one or more ultrasound images.

In certain embodiments, a system for performing ultrasound imaging includes an ultrasound transducer and a main processing console. The ultrasound transducer can collect ultrasound information of a subject region in response to ultrasound pulses transmitted toward the subject region. The ultrasound information can include both reflectivity information and complementary information to the reflectivity information of the subject region in response to the ultrasound pulses. The main processing console can form one or more ultrasound images of at least a portion of the subject region from the reflectivity information. The main processing console can also modify the one or more ultrasound images based on the complementary information to the reflectivity information to generate one or more enhanced ultrasound images from the one or more ultrasound images.

In various embodiments, a system for performing ultrasound imaging includes one or more processors and a computer-readable medium providing instructions accessible to the one or more processors to cause the one or more processors to collect ultrasound information of a subject region in response to ultrasound pulses transmitted toward the subject region. The ultrasound information can include both reflectivity information and complementary information to the reflectivity information of the subject region in response to the ultrasound pulses. The instructions can further cause the one or more processors to form one or more ultrasound images of at least a portion of the subject region from the reflectivity information. Additionally, the instructions can cause the one or more processors to modify the one or more ultrasound images based on the complementary information to the reflectivity information to generate one or more enhanced ultrasound images from the one or more ultrasound images.

BRIEF DESCRIPTION OF THE DRAWINGS

FIG. 2 is a flowchart of an example method for modifying an ultrasound image based on complementary information to reflectivity information of ultrasound pulses used in generating the ultrasound image.

DETAILED DESCRIPTION

Figure 1:
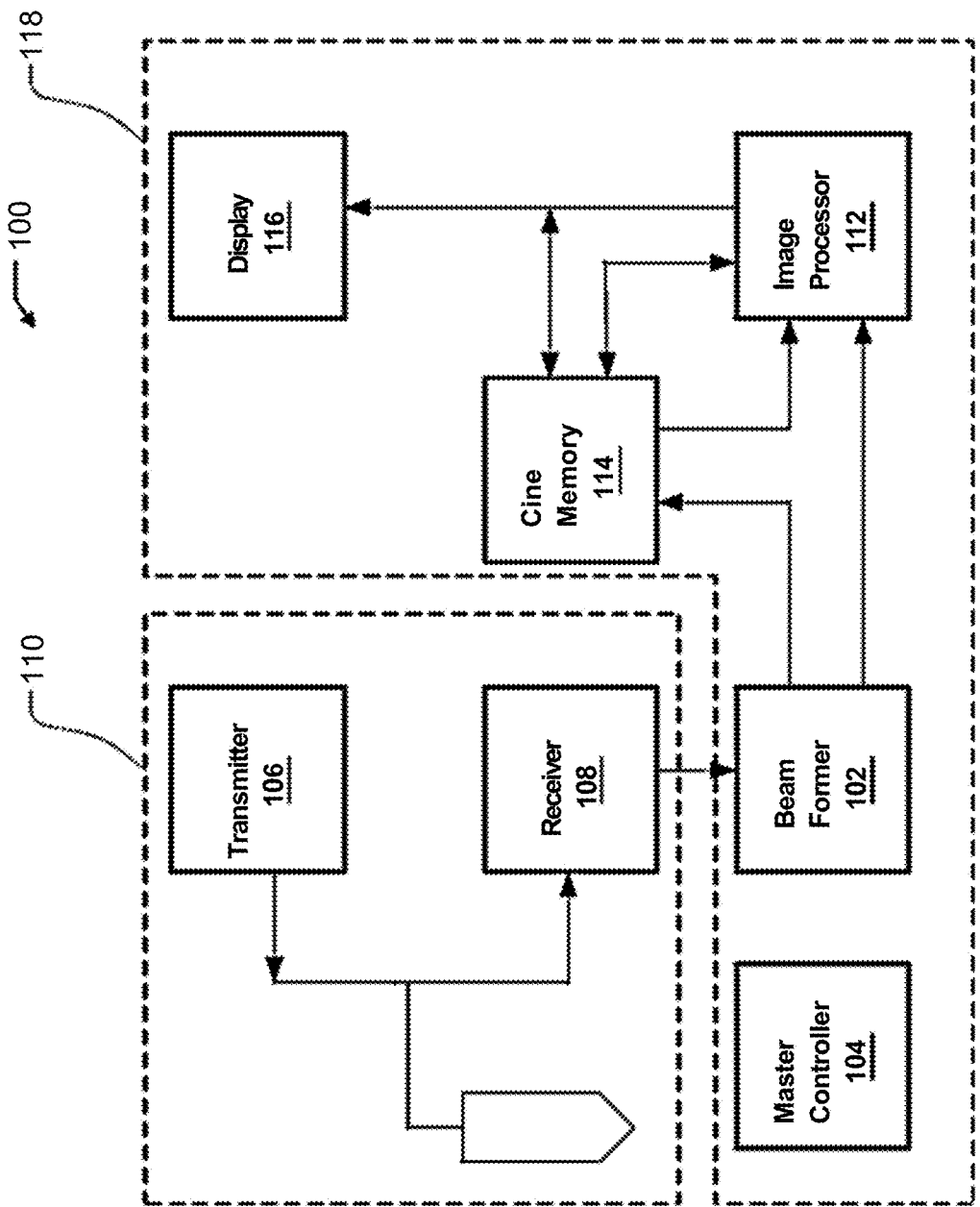
FIG. 1 illustrates an example of an ultrasound system.

Enhancing ultrasound images continues to be an important area of focus. Specifically, it is critical that ultrasound images can be enhanced to accurately display information related to different types of tissue, e.g. in the same ultrasound image. In turn, this can allow doctors to more easily diagnose diseases and provide treatments for the diseases based on their diagnoses.

In particular, as clinically significant structures often times have similar echogenicity to that of background tissue, it becomes very difficult to create ultrasound images that represent distinguishing characteristics between the structures and the background tissue. For example, ultrasound images typically suffer from limited contrast resolution as a number of clinically significant structures have similar echogenicity to that of background tissue. In turn, it becomes difficult for doctors to quickly and accurately diagnose diseases based on these images and provide treatments for such diseases.

Many attempts have been made to characterize underlying tissue properties with ultrasound. One technology, in particular, has been used to measure the speed of sound propagation within the tissue. However, obtaining a high-resolution sound speed map that can be used to correct for wave dispersion of an ultrasound transmit can be difficult to calculate. This makes it more difficult to characterize underlying tissue properties through ultrasound and ultimately provide the ability for doctors to quickly and accurately provide medical diagnoses and treatment.

The following disclosure describes systems, methods, and computer-readable media for solving these problems/discrepancies. Specifically, the present technology involves system, methods, and computer-readable media for collecting complementary information to reflectivity information generated through ultrasound pulses and enhancing or otherwise modifying ultrasound images based on the complementary information. More specifically, the present technology involves systems, methods, and computer-readable media for identifying one or more regions to modify in an ultrasound image based on complementary information to reflectivity information used to generate the image. In turn, the one or more regions can be modified based on the complementary information, e.g. to enhance the quality of the ultrasound image or the contrast in the ultrasound image.

Specifically and as will be discussed in greater detail later, a low-resolution sound speed map can be generated based on collected complementary information to reflectivity information. In turn, the sound speed map can be applied to enhance the contrast resolution of a B-Mode ultrasound image. The data used to produce the sound speed map and the B-Mode image can be identical and generated through the same transmit/receive profile(s). Alternatively, the data used to produce the sound speed map and the B-mode image can be distinctly gathered through separate transmit/receive profiles, e.g. to optimize the performance of each of the modalities.

Reference is now made to the figures, where like components are designated by like reference numerals throughout the disclosure. Some of the infrastructure that can be used with embodiments disclosed herein is already available, such as general-purpose computers, computer programming tools and techniques, digital storage media, and communications networks. A computing device may include a processor such as a microprocessor, microcontroller, logic circuitry, or the like. The processor may include a special purpose processing device such as an Application-Specific Integrated Circuit (ASIC), Programmable Array Logic (PAL), Programmable Logic Array (PLA), Programmable Logic Device (PLD), Field-Programmable Gate Array (FPGA), or other customized or programmable device. The computing device may also include a computer-readable storage device such as non-volatile memory, static RAM, dynamic Random Access Memory (RAM), Read-Only Memory (ROM), Compact Disc Read-Only Memory (CD-ROM), disk, tape, magnetic, optical, flash memory, or other non-transitory computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., which performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 is a schematic block diagram of one exemplary embodiment of a medical imaging device, such as an ultrasound imaging device 100. Those skilled in the art will recognize that the principles disclosed herein may be applied to a variety of medical imaging devices, including, without limitation, an X-ray imaging device, a computed tomography (CT) imaging device, a magnetic resonance imaging (MRI) device, and a positron-emission tomography (PET) imaging device. As such, the components of each device may vary from what is illustrated in FIG. 1.

In one embodiment, the ultrasound imaging device 100 may include an array focusing unit, referred to herein as a beam former 102, by which image formation can be performed on a scanline-by-scanline basis. The device may be controlled by a master controller 104, implemented by a microprocessor or the like, which accepts operator inputs through an operator interface and in turn controls the various subsystems of the device 100.

For each scanline, a transmitter 106 generates a radio-frequency (RF) excitation voltage pulse waveform and applies it with appropriate timing across a transmit aperture (defined, in one embodiment, by a sub-array of active elements) to generate a focused acoustic beam along the scanline.

RF echoes received by one or more receive apertures or receiver 108 are amplified, filtered, and then fed into the beam former 102, which may perform dynamic receive focusing, i.e., realignment of the RF signals that originate from the same locations along various scan lines. Collectively, the transmitter 106 and receiver 108 may be components of a transducer 110. Various types of transducers 110 are known in the ultrasound imaging art, such as linear probes, curvilinear probes, and phased array probes.

An image processor 112 may perform processing tasks specific to various active imaging mode(s) including 2D scan conversion that transforms the image data from an acoustic line grid into an X-Y pixel image for display. For other modes, such as a spectral Doppler mode, the image processor 112 may perform wall filtering followed by spectral analysis of Doppler-shifted signal samples using typically a sliding Fast Fourier Transform (FFT)-window. The image processor 112 may also generate a stereo audio signal output corresponding to forward and reverse flow signals. In cooperation with the master controller 104, the image processor 112 may also format images from two or more active imaging modes, including display annotation, graphics overlays and replay of cine loops and recorded timeline data.

A cine memory 114 provides resident digital image storage to enable single image or multiple image loop review, and acts as a buffer for transfer of images to digital archival devices, such as hard disk drives or optical storage. In some systems, the video images at the end of the data processing path may be stored to the cine memory. In state-of-the-art systems, amplitude-detected, beamformed data may also be stored in cine memory 114. For spectral Doppler mode, wall-filtered, baseband Doppler 1/Q data for a user-selected range gate may be stored in cine memory 114. Subsequently, a display 116, such as a computer monitor, may display ultrasound images created by the image processor 112 and/or images using data stored in the cine memory 114.

The beam former 102, the master controller 104, the image processor 112, the cine memory 114, and the display 116 can be included as part of a main processing console 118 of the ultrasound imaging device 100, which may include more or fewer components or subsystems than are illustrated. The ultrasound transducer 110 may be incorporated into an apparatus that is separate from the main processing console 118, e.g. in a separate apparatus that is wired or wirelessly connected to the main processing console 118. This allows for easier manipulation of the ultrasound transducer 110 when performing specific ultrasound procedures on a patient. Further, the transducer 110 can be an array transducer that includes an array of transmitting and receiving elements for transmitting and receiving ultrasound waves.

Those skilled in the art will recognize that a wide variety of ultrasound imaging devices are available on the market, and additional details relating to how images are generated is unnecessary for a thorough understanding of the principles disclosed herein. Specifically, the systems, methods, and computer-readable media described herein can be applied through an applicable ultrasound imaging device of the wide variety of ultrasound imaging devices available on the market.

FIG. 2 is a flowchart of an example method 200 for modifying an ultrasound image based on complementary information to reflectivity information of ultrasound pulses used in generating the ultrasound image. The example method shown in FIG. 2, and other methods and techniques for ultrasound imaging described herein, can be performed by an applicable ultrasound imaging system, such as the ultrasound imaging device 100 shown in FIG. 1. For example, the techniques for ultrasound imaging described herein can be implemented using either or both the ultrasound transducer 110 and the main processing console 118, e.g. the image processor 112, of the ultrasound imaging device 100.

At step 202, ultrasound information of a subject region is collected. The ultrasound information includes both reflectivity information and complementary information to the reflectivity information generated in response to ultrasound pulses transmitted towards the subject region. Specifically, reflectivity information generated based on the interaction of ultrasound pulses with the subject region can be collected at step 202. Further, complementary information to the reflectivity information generated based on the interaction of ultrasound pulses with the subject region can be collected at step 202. The reflectivity information and the complementary information can be generated by an applicable ultrasound component, such as ultrasound transducer 110 shown in FIG. 1.

Reflectivity information includes applicable information used in generating ultrasound images of at least a portion of the subject region. Specifically, reflectivity information can include information of reflections of ultrasound pulses transmitted into the subject region, e.g. information of backscattered ultrasound pulses. In turn and as will be discussed in greater detail later, the information of the reflections can be used to generate ultrasound images through an applicable imaging/image formation technique.

Complementary information to the reflectivity information includes applicable information that can be gathered from the ultrasound pulses transmitted towards the subject region. Specifically, complementary information to the reflectivity information can include applicable information that can be gathered from the ultrasound pulses that is not used in directly forming ultrasound images. Specifically, complementary information to the reflectivity information can include propagation speeds of the ultrasound pulses in interacting with the subject region, information related to elasticity of the subject region, information related to stiffness of the subject region, and values of an acoustic non-linearity parameter associated with the subject region. For example, complementary information can include sound speeds of ultrasound pulses as the pulses interact with the subject region and are reflected from the subject region. In another example, complementary information to the reflectivity information can include variations in lateral spatial spectral signals at varying depths.

The reflectivity information and the complementary information can be generated through the same ultrasound pulses transmitted towards the subject region. Specifically, the reflectivity information and the complementary information to the reflectivity information can be generated through the same ultrasound transmit and receive profile(s). For example, a B-Mode image can be produced by compounding across frames, e.g. 2 to 9 frames, of image data. As follows the same ultrasound pulses used in creating the compounded frames of image data can also be used to produce a number, e.g. 2 to 9, of sounds speed maps. In turn, the sound speed maps can be combined to generate an accurate estimate of sound speeds.

Further, the reflectivity information and the complementary information can be distinctly generated through different ultrasound pulses transmitted towards the subject region. Specifically, the reflectivity information and the complementary information can be distinctly generated through separate ultrasound transmit and receive profiles. For example, a first ultrasound transmit and receive profile can be applied to generate the reflectivity information and a second ultrasound transmit and receive profile can be applied to generate the complementary information separately from the reflectivity information. For example and with respect to propagation speed as the complementary information, an ideal transmit profile for estimating propagation speed is not necessarily an optimized profile for B-Mode imaging, and vice versa. Accordingly, the complementary information for identifying the propagation speed can be generated separately from the reflectivity information for performing B-mode imaging.

The reflectivity information and the complementary information can be generated through the same ultrasound transmit receive profile(s) based on characteristics of the subject region. Specifically, the reflectivity information and the complementary information can be created through the ultrasound transmit receive profile(s) if the tissue being imaged is fast moving. For example, if the heart is the subject region, then reflectivity information and the complementary information can be generated through the same ultrasound pulses transmitted towards the heart as the heart is a fast moving structure. Additionally, the reflectivity information and the complementary information can be distinctly generated through different ultrasound transmit receive profiles based on characteristics of the subject region. Specifically, the reflectivity information and the complementary information can be created through different ultrasound transmit receive profiles if the tissue being imaged is slow moving. For example, if the thyroid is the subject region, then the reflectivity information and the complementary information can be generated through different ultrasound pulses transmitted towards the thyroid as the thyroid is a slow moving structure.

The complementary information can be generated over a plurality of ultrasound transmit and receive profiles to generate compound complementary information. For example and as discussed previously, a plurality of sound speed maps can be generated across a plurality of ultrasound transmit and receive profiles to generate compound complementary information including the plurality of sound speed maps. Further in the example, the plurality of sound speed maps can be compounded or otherwise combined to form a compound sound speed map of the compound complementary information. The compound complementary information can be generated through a plurality of transmit and receive profiles that are separate from transmit and receive profile(s) used in creating the reflectivity information. Further, the compound complementary information can be generated through a plurality of transmit and receive profiles that are also used to create the reflectivity information. The compound complementary information, as will be discussed in greater detail later, can be applied to modify the one or more ultrasound images generated from the reflectivity information.

In forming the compound complementary information across a plurality of ultrasound transmit and receive profiles, artifacts can be filtered out from the complementary information used in generating the compound complementary information. Specifically, the complementary information can be combined, when forming the compound complementary information, to filter out artifacts from the complementary information. For example, when multiple sound speed maps are created through different transmit origins, artifacts that are generated in each map will not be collocated across the sound speed maps with respect to the subject region. In turn, when the sound speed maps are combined the total number of artifacts in a combined sound speed map, e.g. the compound complementary information, can be reduced or otherwise eliminated. This can lead to improvements in enhancing or otherwise modifying ultrasound images with the compound complementary information.

At step 204, one or more ultrasound images of at least a portion of the subject region are formed from the reflectivity information. Ultrasound images formed at step 204 can be generated from the reflectivity information using an applicable technique. Specifically, B-Mode ultrasound images can be formed from the reflectivity information through one or more applicable B-Mode imaging techniques. Examples of B-Mode imaging techniques include a fundamental imaging technique, a fundamental spatial compounding imaging technique, a harmonic imaging technique, a harmonic spatial compounding imaging technique, a fundamental and harmonic compounding imaging technique, and a fundamental and harmonic spatial compounding imaging technique.

At step 206, the one or more ultrasound images are modified based on the complementary information to the reflectivity information to generate one or more enhanced ultrasound images. Specifically, the ultrasound images can be modified to present information related to the subject region in a more clear and accurate manner. For example, a contrast in the images can be modified to more clearly show different regions corresponding to different types of tissue in the images of the subject region.

In modifying the one or more ultrasound images based on the complementary information, one or more regions can be identified in the ultrasound images based on the complementary information. In turn, the identified regions in the ultrasound images can be modified or enhanced, e.g. in response to identifying the one or more regions, to ultimately modify the one or more ultrasound images. For example, regions in an ultrasound image corresponding to heart tissue in the subject region can be identified based on the complementary information. As follows, the regions in the ultrasound image corresponding to the heart tissue can be modified or otherwise enhanced to highlight the heart tissue in the ultrasound image.

The one or more ultrasound images can be modified based on a relation of the complementary information to a mean of the complementary information. The mean of the complementary information can correspond to all or a portion of the entire subject region in the one or more ultrasound images. With respect to propagation speed, a propagation speed mean across all or a portion of the subject region can be identified from the propagation speeds included in the complementary information. In turn, one or more regions in the ultrasound images can be identified based on variations of the propagation speeds with respect to the propagation speed mean. Specifically, the one or more regions can be identified based on variations of the propagation speeds corresponding to the one or more regions and the propagation speed mean. For example, if propagation speeds of ultrasound pulses corresponding to a region vary by a specific amount, e.g. a threshold amount, with respect to a propagation speed mean for the subject region, then the region can be identified in the ultrasound image. Further in the example, the region can be separated from surrounding regions in the ultrasound image if the propagation speeds of ultrasound pulses corresponding to the surrounding regions fail to vary by the specific amount, e.g. the threshold amount, with respect to the propagation speed mean for the subject region.

Additionally, the one or more ultrasound images can be modified based on a relation of the complementary information to one or more absolute values of the complementary information. The absolute value of the complementary information can correspond to all or a portion of the entire subject region in the one or more ultrasound images. With respect to propagation speed, absolute value(s) of variations between a propagation speed mean across all or a portion of the subject region can be identified from the propagation speeds included in the complementary information. In turn, one or more regions in the ultrasound images can be identified based on the absolute value(s) of variations between the propagation speeds and the propagation speed mean. Specifically, the one or more regions can be identified based on absolute value(s) of variations between the propagation speeds corresponding to the one or more regions and the propagation speed mean. For example, if an absolute value of the variation between propagation speeds of ultrasound pulses for a region and a propagation speed mean is greater than a specific amount, e.g. threshold amount, then the region can be identified in the ultrasound image. Further in the example, the region can be separated from surrounding regions in the ultrasound image if absolute value(s) of the variation between propagation speeds of ultrasound pulses of the surrounding regions and the propagation speed mean are less than the specific amount, e.g. the threshold amount.

In modifying the one or more identified regions of the ultrasound image(s), the regions can be modified in an applicable way to distinguish the one or more identified regions from the surrounding areas in the ultrasound image(s). Specifically, the one or more identified regions can be colored to distinguish the region(s) from the surrounding areas to the region(s) in the ultrasound image(s). More specifically, the region(s) can be colored in a specific manner based on the complementary information corresponding to the region(s). For example, the region(s) that have corresponding sound propagation speeds that are above a mean propagation speed can be colored as red. Further in the example, the region(s) that have corresponding sound propagation speeds that are below the mean propagation speed can be colored as blue. In another example, the mean sound speed velocity of tissue can be normalized and regions that deviate from the mean can be colored to produce a transparent color overlay that can be added to a B-Mode image. In turn, this can provide direct information to the clinician as to where there are deviations of the tissue properties as estimated from the sound speed variations.

Further, brightness levels in the one or more identified regions can be modified to distinguish the region(s) from the surrounding areas to the region(s) in the ultrasound image(s). More specifically, the brightness levels in the region(s) can be adjusted based on the complementary information corresponding to the region(s). For example, brightness levels in the region(s) that have corresponding sound propagation speeds that are above a mean propagation speed can be increased. Further in the example, brightness levels in the region(s) that have corresponding sound propagation speeds that are below the mean propagation speed can be decreased.

Additionally, one or more gains for the one or more ultrasound images can be modified as part of modifying the one or more ultrasound images. Specifically, gain(s) of the identified region(s) in the ultrasound images can be modified, e.g. in response to identifying the region(s) in the ultrasound images based on the complementary information. The gains corresponding to the identified regions in the ultrasound images can be modified based on the complementary information, e.g. the same complementary information used to identify the regions. Specifically, the gain of the identified regions in the ultrasound images can be modified based on an amount of variation between complementary information corresponding to the regions and an average of at least a portion of the complementary information.

Gains for the ultrasound images can be adjusted based on propagation speeds of ultrasound pulses corresponding to the ultrasound images. Specifically, gains in the identified regions can be adjusted based on propagation speeds of the ultrasound pulses corresponding to the identified regions. More specifically, gains in the identified regions can be adjusted based on variations between the propagation speeds of the ultrasound pulses corresponding to the identified regions and the propagation speed mean. For example, gains in regions of the ultrasound image(s) with propagation speeds that are greater than the propagation speed mean can be increased and gains in regions of the ultrasound image(s) with propagation speeds that are less than the propagation speed mean can be decreased. Alternatively, gains in regions of the ultrasound image(s) with propagation speeds that are less than the propagation speed mean can be increased and gains in regions of the ultrasound image(s) with propagation speeds that are greater than the propagation speed mean can be decreased.

Further, gains for the ultrasound images can be adjusted based on an amount of variation between the complementary information and an average of at least a portion of the complementary information with respect to a threshold. Specifically, gains for the ultrasound images can be adjusted based on an amount of variation between propagation speeds and the propagation speed mean with respect to a threshold. For example, if the amount of variation between propagation speeds of pulses for a region and the mean propagation speed is greater than a threshold amount, then one or more gains for the region can be increased. Further in the example, if the amount of variation between propagation speeds of pulses for a region and the mean propagation speed is less than the threshold amount, then one or more gains for the region can be decreased. Alternatively, if the amount of variation between propagation speeds of pulses for a region and the mean propagation speed is greater than a threshold amount, then one or more gains for the region can be decreased. In turn, if the amount of variation between propagation speeds of pulses for a region and the mean propagation speed is less than the threshold amount, then one or more gains for the region can be increased. A threshold for applying the techniques described here, e.g. a threshold for adjusting gain, can be defined according to an applicable technique and/or by an applicable entity. For example, an operation of an ultrasound system can define a threshold for selectively adjusting gain in one or more ultrasound images based on the complementary information.

The techniques of identifying the one or more regions in the ultrasound image(s) based on the complementary information and modifying the ultrasound image(s) based on the complementary information can be achieved using one or more sound speed maps. A sound speed map can include a mapping of propagation speeds of ultrasound pulses across the subject region. Further, a sound speed map can correspond to the one or more ultrasound images. Specifically, a region in the sound speed map can correspond to a specific region in an ultrasound image such that propagation speeds of ultrasound pulses in the region of the sound speed map are propagation speeds of ultrasound pulses corresponding to the specific region in the ultrasound image. For example, propagation speeds in a region of the sound speed map can indicate propagation speeds of ultrasound pulses interacting with specific heart tissue. In turn, the portion of an ultrasound that includes the heart tissue can correspond to the region of the sound speed map that indicated the propagation speeds of ultrasound pulses interacting with the heart tissue.

One or more sound speed maps can be generated from the complementary information to the reflectivity information. As follows, the one or more regions in the ultrasound image(s) can be identified using the sound speed map(s). For example, a region can be identified from a sound speed map if the propagation speeds for ultrasound pulses of the region, as indicated by the sound speed map, are above a mean propagation speed. In turn, the one or more regions identified using the sound speed map(s) can be modified based on the sound speed map(s).

Figure 3:
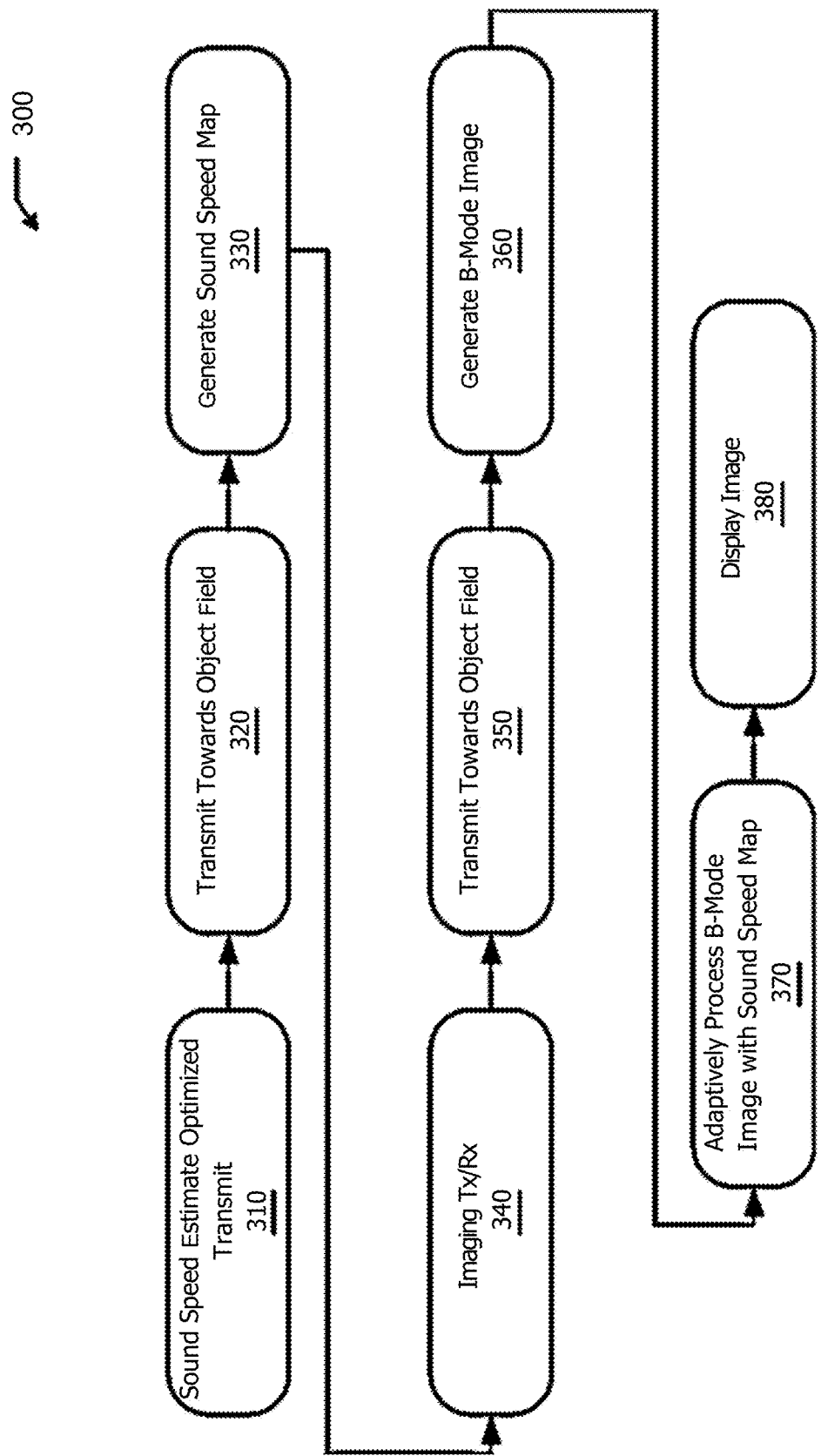
FIG. 3 is a flowchart of an example method for generating an ultrasound image with enhanced contrast resolution through the use of a sound speed map.

FIG. 3 is a flowchart 300 of an example method for generating an ultrasound image with enhanced contrast resolution through the use of a sound speed map. As described previously, the sound speed map can be generated through distinct ultrasound pulses that are separate from the ultrasound pulses used to generate an ultrasound image. Alternatively, the sound speed map can be generated through the same ultrasound pulses that are used to generate an ultrasound image. In the example method shown in the flowchart 300, independent transmit/receive frames are used to generate the sound speed map. Specifically, at step 310 a transmit sequence that is optimized for estimation for the sound speed is identified. At step 320, ultrasound pulses are transmitted towards the object field according to the transmit sequence identified at step 310. Then, at step 330, the backscatter received from the object field is used to generate a sound speed map. At step 340, the imaging Tx/Rx sequence for imaging through B-Mode type imaging is identified. At step 350, ultrasound pulses are transmitted towards the object field according to the imaging Tx/Rx sequence identified at step 340. At step 360, a B-Mode image is generated based on the backscatter from the Tx/Rx sequence. At step 370, the B-Mode image is adaptively processed using the sound speed map. Specifically, regions where the sound speed varies from the normal in the B-Mode Image can be enhanced based on the sound speed map. At step 380, the processed image is displayed.

Figure 4:
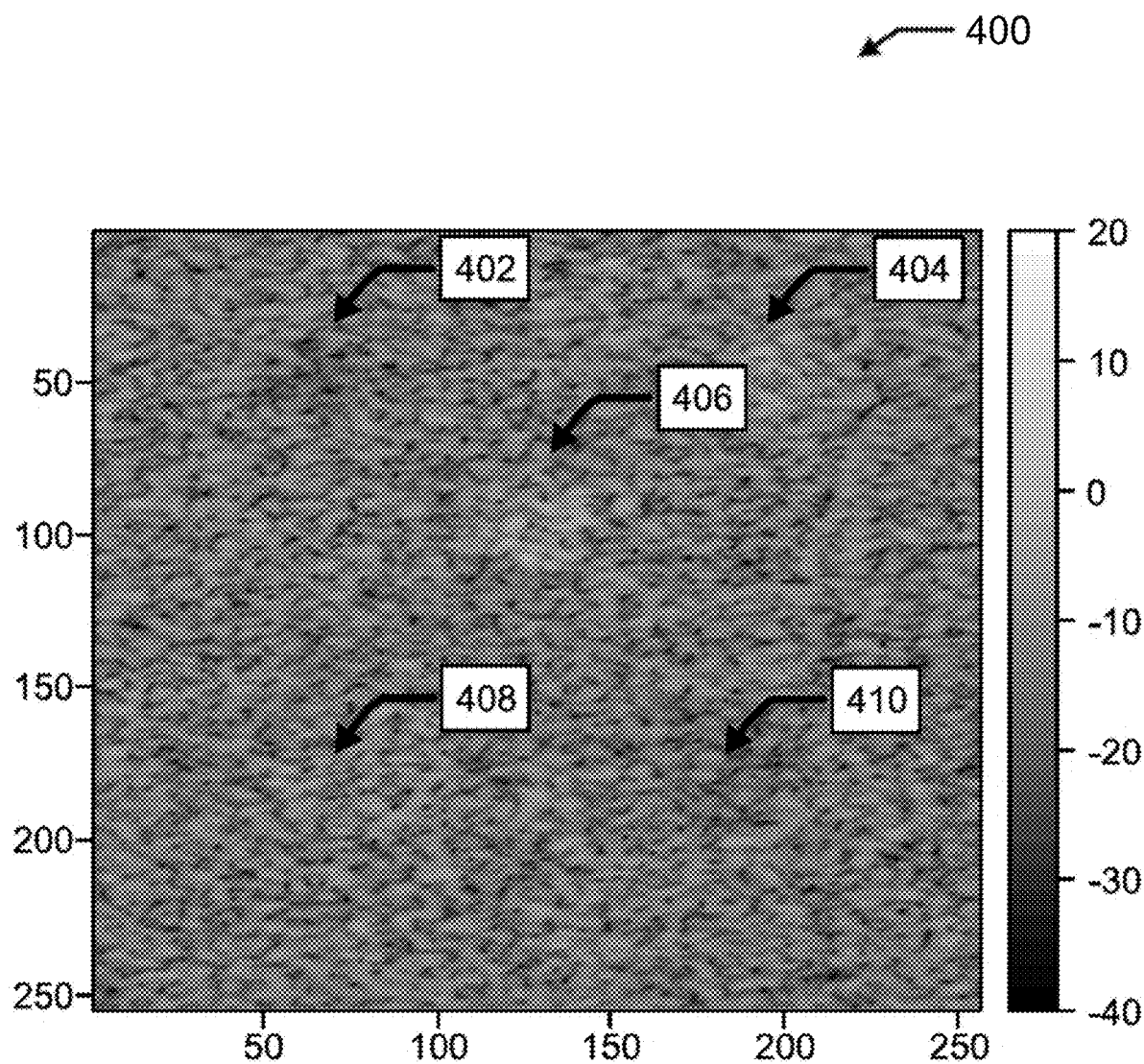
FIG. 4 is an unenhanced B-Mode image with 5 known targets that differ in propagation speed from a mean propagation speed.

FIG. 4 is an unenhanced B-Mode image 400 with 5 known targets that differ in propagation speed from a mean propagation speed. The know targets in the B-Mode image 400 are extremely difficult to see as their backscatter properties only differ slightly from the backscatter properties of the surround regions, e.g. surrounding material. The first target that has a higher sound speed than the mean is located at region 402. The second target that has a lower sound speed than the mean is located at region 404. The third target that has a slightly lower sound speed than the mean is located at region 406. The four target that has a higher sound speed than the mean is located at region 408, and the fifth target that has a lower sound speed than the mean is located at region 410. As shown in the B-mode image 400, it is difficult to accurately visualize where these regions 402-410 are located.

Figure 5:
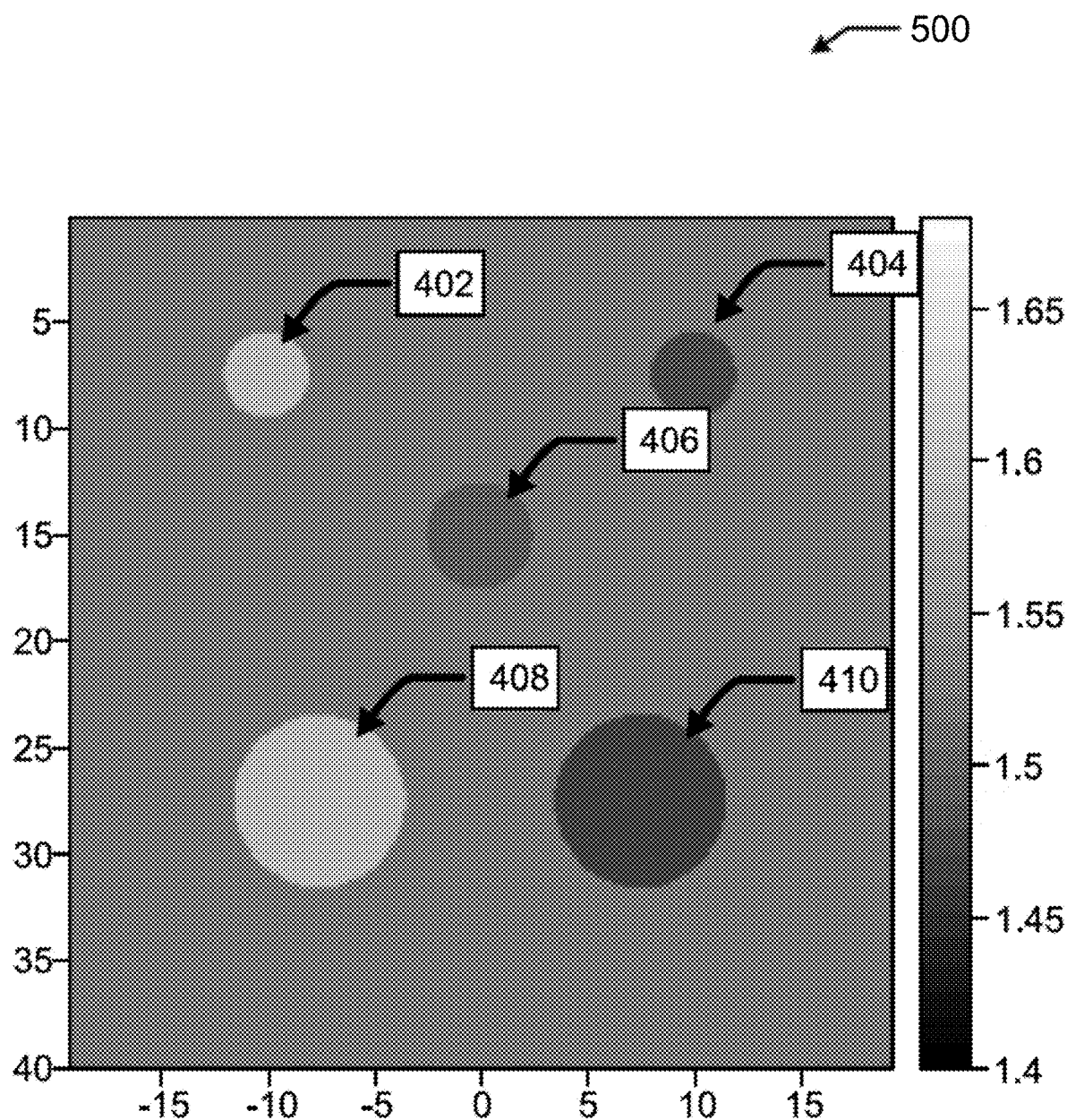
FIG. 5 is a sound speed map of the actual propagation speeds of the ultrasound pulses for the material and the five regions in the B-Mode image shown in FIG. 4.

FIG. 5 is a sound speed map 500 of the actual propagation speeds of the ultrasound pulses for the material and the five regions 402-410 in the B-Mode image 400 shown in FIG. 4. The background sound speed of the phantom, surrounding region to the regions 402-410, is around 1.54 mm/uS. The first region 402 is a small round region that has a corresponding ultrasound propagation speed of around 1.65 mm/uS. The second region 404 is a small round region that has a corresponding ultrasound propagation speed of around 1.45 mm/uS. The third region 406 is a small round region that has a corresponding ultrasound propagation speed of around 1.50 mm/uS. The fourth region 408 is a large round region that has a corresponding ultrasound propagation speed of around 1.65 mm/uS. The fifth region 410 is a large round region that has a corresponding ultrasound propagation speed of around 1.43 mm/uS.

Figure 6:
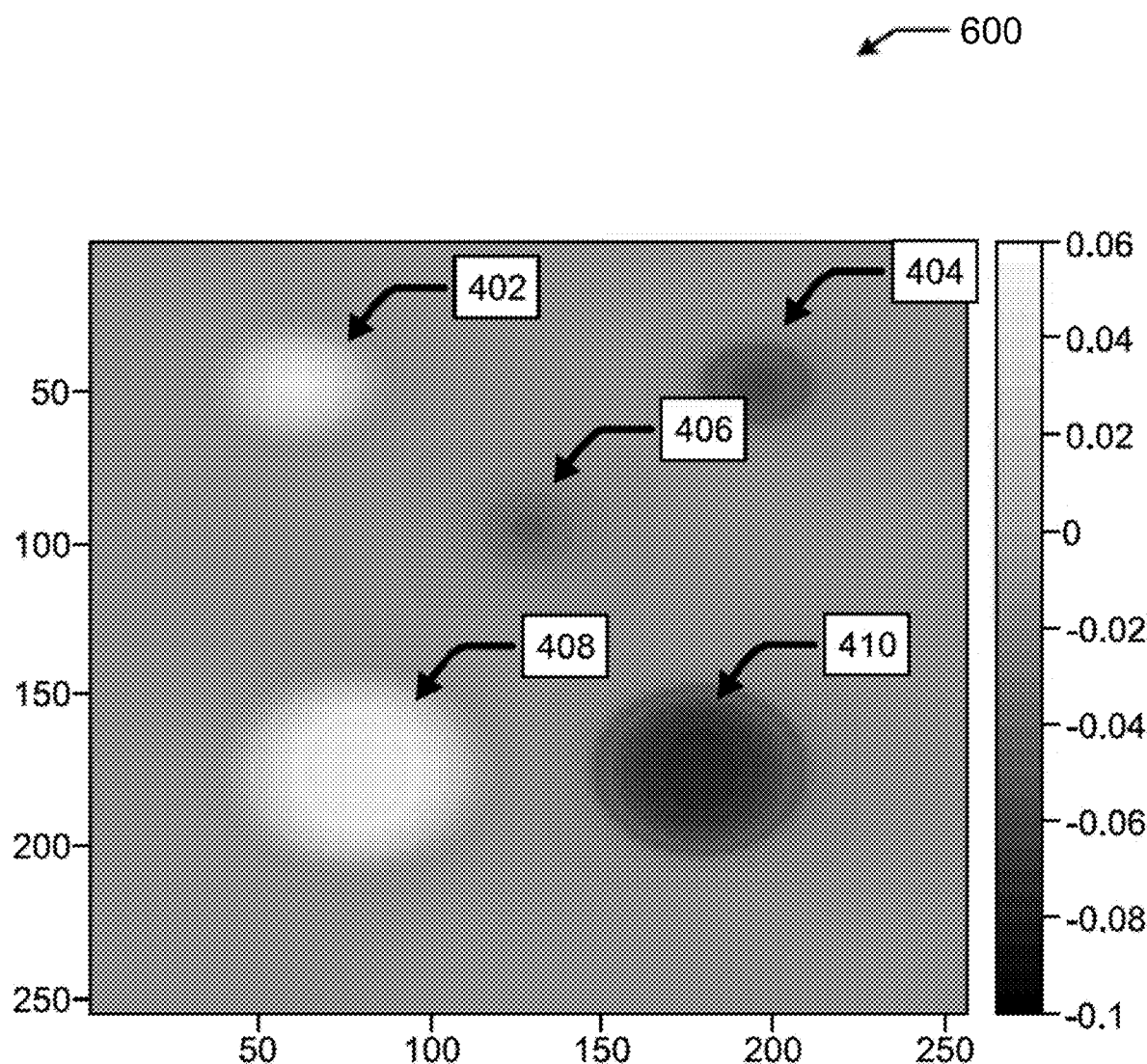
FIG. 6 is a sound speed map of the estimated propagation speed deviations from the mean of the phantom for the material and the five regions for the propagation speeds indicated by the sound speed map shown in FIG. 5.

FIG. 6 is a sound speed map 600 of the estimated propagation speed deviations from the mean of the phantom for the material and the five regions 402-410 for the propagation speeds indicated by the sound speed map 500 shown in FIG. 5. As can be seen the estimates of the sound speed deviations are lower in resolution than the true targets in the phantom as the edges slowly vary back to the mean sound speed instead of have an abrupt change. The first region 402, is estimated to differ by about 0.05 mm/uS from the mean at the center and slowly transition back to the mean propagation speed. The second region 404 is estimated to differ by about −0.06 mm/uS from the mean at the center and slowly transition back to the mean propagation speed. The third region 406 is estimated to differ by about −0.02 mm/uS from the mean at the center and slowly transition back to the mean propagation speed. The fourth region 408 is estimated to differ by about 0.06 mm/uS from the mean at the center and slowly transition back to the mean propagation speed. The fifth region 410 is estimated to differ by about −0.10 mm/uS from the mean at the center and slowly transition back to the mean propagation speed.

The propagation speeds for the sound speed map 500 and the propagation speed deviations shown in the sound speed map 600 can be gathered through a low-resolution method, e.g. using ultrasound pulses operating in a low-resolution imaging or information gathering mode. As shown in FIG. 6, the low-resolution method of obtaining a robust estimate results in the biasing of the propagation speed estimates towards the mean for the smaller region, e.g. 402, 404, and 406. Even though obtaining a robust sound speed map estimate can result in a low-resolution image, this information can still be useful in indicating where there are variations in propagation speed. In turn, the information indicating variation in propagation speed can be used to enhance the contrast resolution of the B-Mode image 400. Further, as more robust higher resolution estimates of propagation speed are capable of being generated, this same adaptive combination of the sound speed map and the B-Mode image only gets better.

Figure 7:
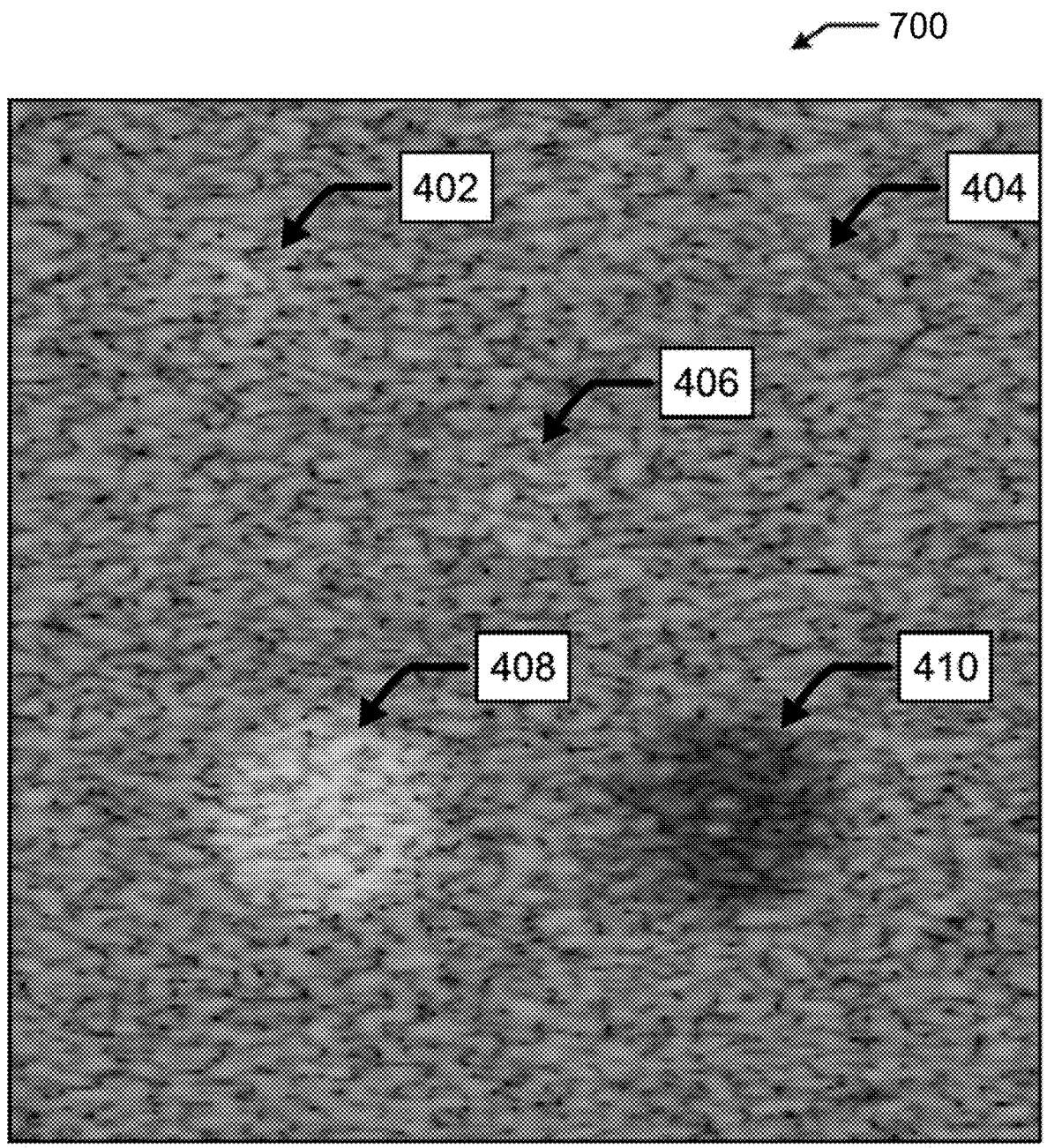
FIG. 7 is a composite image including the B-Mode phantom and the sound speed map overlaid with the mean propagation speed value removed.

FIG. 7 is a composite image 700 including the B-Mode phantom and the sound speed map 600 overlaid with the mean propagation speed value removed. As shown in FIG. 7, the regions are more clearly visible than in the B-Mode image 400 of FIG. 4. The first region 402 shows a small round target where the corresponding ultrasound propagation speed is higher than the background. The second region 404 shows a small round target where the corresponding ultrasound propagation speed is lower than the background. The third region 406 shows a small round target where the corresponding ultrasound propagation speed is lower than the background. The fourth region 408 shows a large round target where the corresponding ultrasound propagation speed is higher than the background. The fifth region 410 shows a large round target where the corresponding ultrasound propagation speed is lower than the background.

Figure 8:
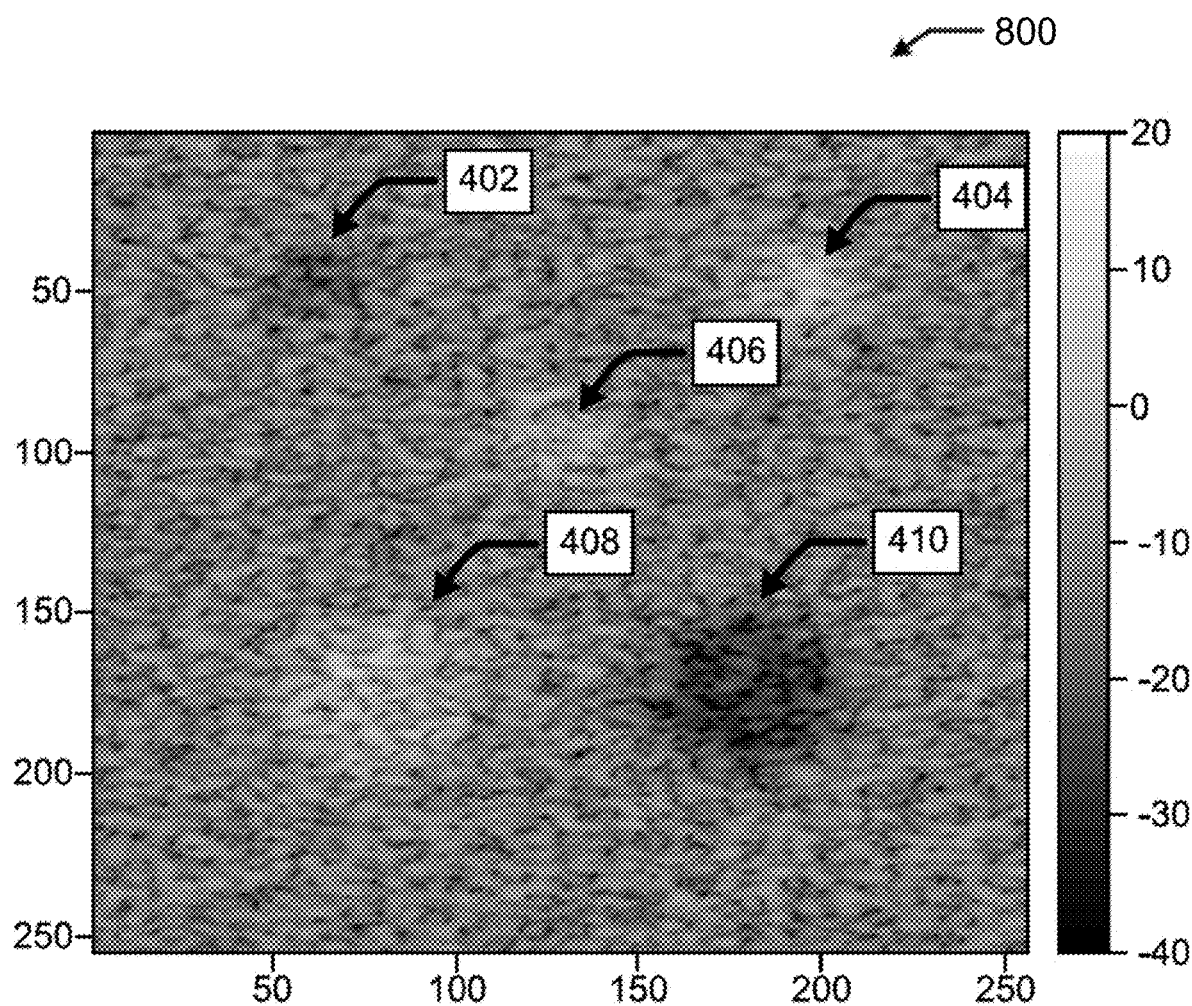
FIG. 8 is an enhanced B-Mode image with contrast resolution that is modified based on the sound speed map to adjust the gain of the areas of differing propagation speeds.

FIG. 8 is an enhanced B-Mode image 800 with contrast resolution that is modified based on the sound speed map 600 to adjust the gain of the areas of differing propagation speeds. Specifically, to create the enhanced B-Mode image 800, the un-altered gray scale level of the subject region is measured from the background of the B-Mode image 400 and enhanced by selectively adjusting the gain in portions of the B-Mode image 400. The degree of gain enhancement that is applied is proportional to each region's 402-410 variation from the mean propagation speed. As can be seen the overall contrast resolution of the regions of varying sound speed are clearly indicated as compared to the B-Mode image 400. The first region 402 has a higher corresponding ultrasound propagation speed than the background and is decreased in gain to clearly show a small round structure. The second region 404 has a lower corresponding ultrasound propagation speed than the background and is increased in gain to clearly show a small round structure. The third region 406 has a lower corresponding ultrasound propagation speed than the background and is increased in gain to clearly show a small round structure. The fourth region 408 has a higher corresponding ultrasound propagation speed than the background and is increased in gain to clearly show a large round structure. The fifth region 410 has a lower corresponding ultrasound propagation speed than the background and is decreased in gain to clearly show a large round structure.

Figure 9:
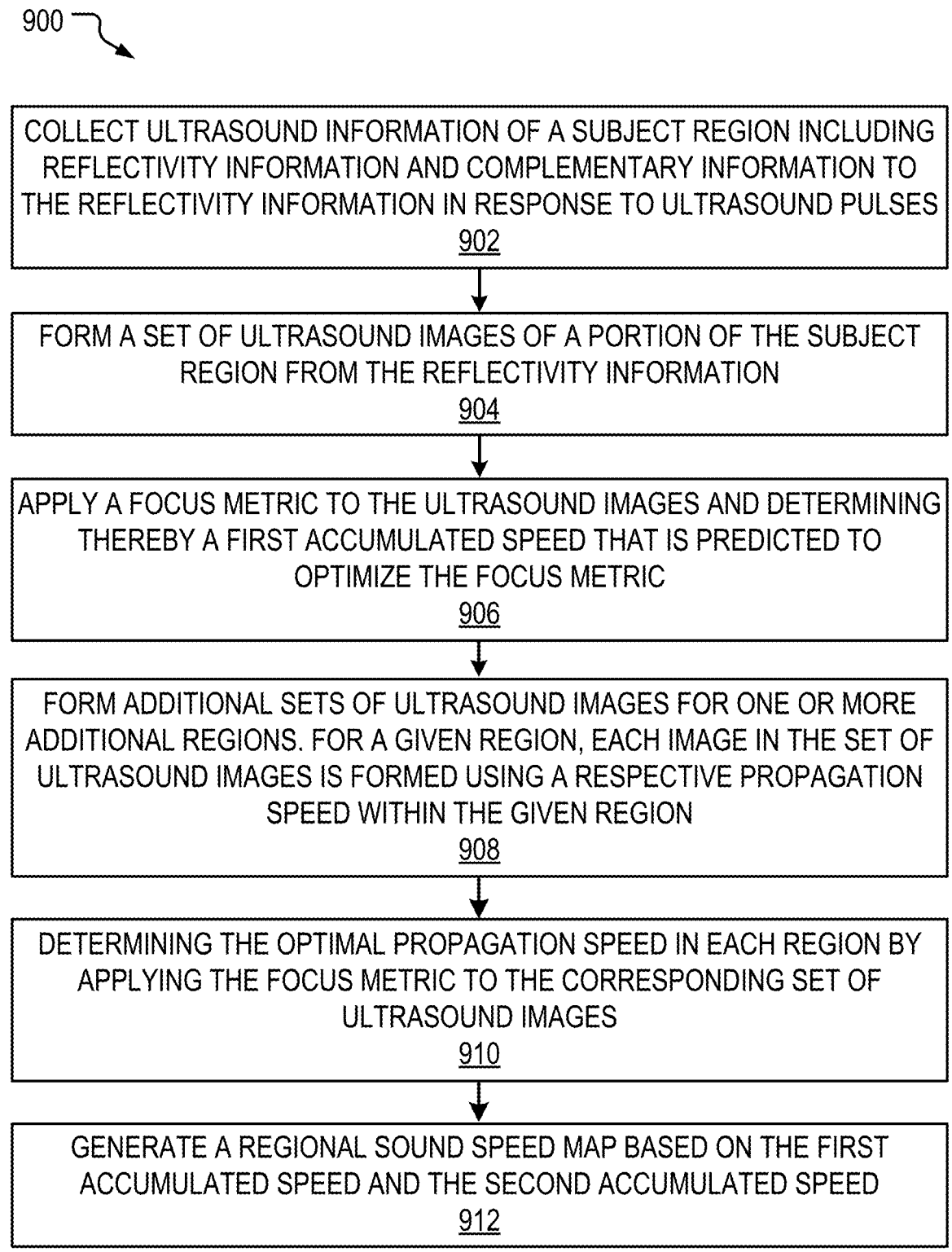
FIG. 9 is a flowchart of an example method for generating a sound speed map.

FIG. 9 illustrates a flowchart of method 900 for generating a regional sound map of an ultrasound image based on reflectivity information of ultrasound pulses used in generating the ultrasound image. The inverse problem of generating images based on the reflected pulses in an ultrasound depends on the propagation speed of the ultrasound pulses through the medium, which can vary as a function of position. In solids, for example, the speed of sound is proportional to the square root of the ratio of the Young's modulus to the density of the medium. Consequently, all other properties being equal, the stiffer or more rigid the medium, the faster sound waves generally propagate in solids. Similarly, in liquids, the speed of sound is proportional to the square root of the ratio of the bulk modulus to the density of the medium. In human tissue, the speed of sound is generally about 1540 m/sec, but the sound speed can deviate from this value. Deviations in the sound speed can be indicative of the state of health of certain tissues, and therefor the sound speed map can be of diagnostic and therapeutic value.

When the propagation speed is slower along a propagation path of an ultrasound pulse, the ultrasound pulse takes longer to propagate to and from the tissue causing the reflection, and therefore the reflections of the ultrasound pulses are delayed relative to propagating through a faster medium. Consequently, reconstructing an image using the incorrect propagation speed results in attributing a given reflection to a position that is offset from the actual position of the reflection. This can result in blurring or artifacts in the reconstructed ultrasound image. Thus, a regional sound speed map has the benefit of reconstructing sharper ultrasound images with fewer artifacts.

Further, an accurate sound speed map can provide clinical/diagnostic information. For example, diseased tissue may not cause significant reflections and therefore may not be visible using traditional ultrasound imaging, but the diseased tissue may nevertheless cause a change in the propagation speed due to the diseased tissue being stiffer than surrounding health tissue, for example. Thus, an accurate sound speed map can provide diagnostic information, which may be used by itself or in combination with other diagnostic information.

Returning to FIG. 9, method 900 can be performed by an applicable ultrasound imaging system, such as the ultrasound imaging device 100 shown in FIG. 1. For example, the techniques for ultrasound imaging described herein can be implemented using either or both the ultrasound transducer 110 and the main processing console 118, e.g. the image processor 112, of the ultrasound imaging device 100.

At step 902, ultrasound information of a subject region is collected. The ultrasound information includes both reflectivity information and complementary information to the reflectivity information generated in response to ultrasound pulses transmitted toward the subject region. Specifically, reflectivity information generated based on the interaction of ultrasound pulses with the subject region can be collected at step 902. Further, complementary information to the reflectivity information generated based on the interaction of ultrasound pulses with the subject region can be collected at step 902. The reflectivity information and the complementary information can be generated by an applicable ultrasound component, such as the ultrasound transducer 110 shown in FIG. 1.

Generally, step 902 can be performed in a same or similar manner to step 202, which is illustrated in FIG. 2. The details disclosed above for step 202 are applicable to certain non-limiting examples of step 902, but the above-disclosed details are not repeated here.

At step 904, one or more ultrasound images of at least a portion of the subject region are formed from the reflectivity information. Ultrasound images formed at step 904 can be generated from the reflectivity information using an applicable technique. Specifically, B-Mode ultrasound images can be formed from the reflectivity information through one or more applicable B-Mode imaging techniques. Examples of B-Mode imaging techniques include a fundamental imaging technique, a fundamental spatial compounding imaging technique, a harmonic imaging technique, a harmonic spatial compounding imaging technique, a fundamental and harmonic compounding imaging technique, and a fundamental and harmonic spatial compounding imaging technique.

Generally, step 904 can be performed in a same or similar manner to step 204. The details for step 204, which are applicable to certain non-limiting examples of step 904, are disclosed above, and are not repeated here.

Figure 11A:
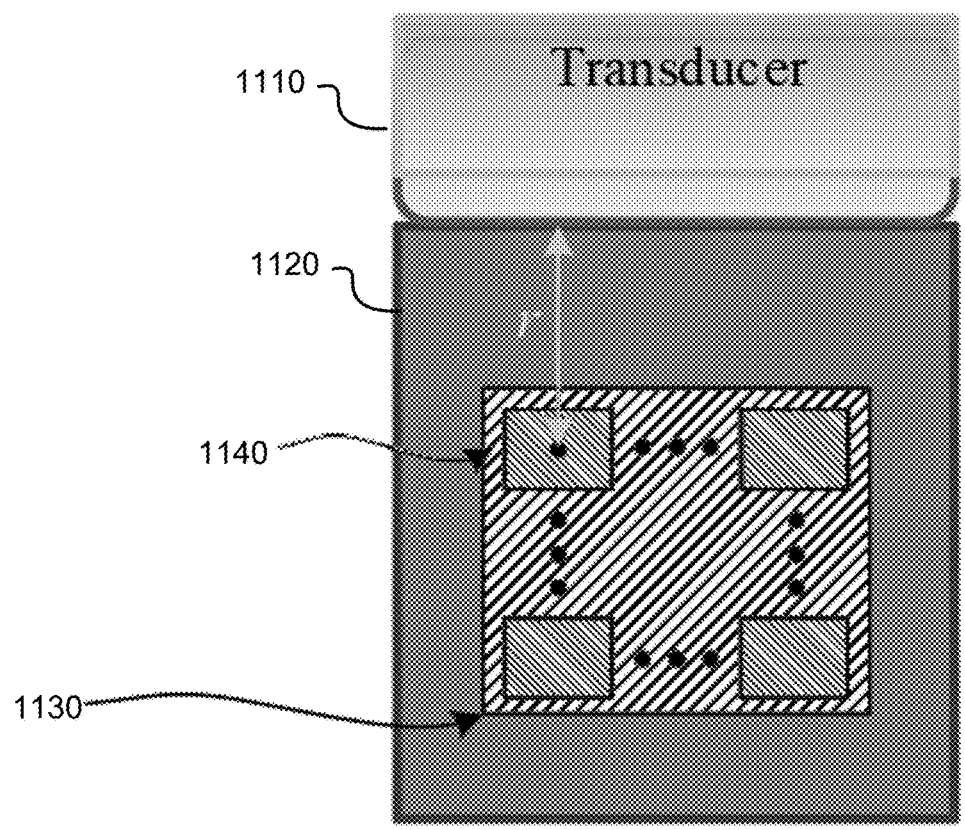
FIG. 11A is a schematic diagram of an example of a transducer transmitting and receiving ultrasound pulses into a region of interest of a subject.

According to certain non-limiting examples, step 904 is illustrated in FIG. 11A, which is described below. Here, it is sufficient to note that a region of interest (ROI) is subdivided into tiles that may or may not be overlapping. For each tile, several ultra-sound images can be formed using different values for the speed of sound within the tiles. Based on the several ultrasound images for the tile, an optimal value is estimated for the speed of sound within the tile. This estimation is performed in step 906, using a focus metric. The ultrasound images for respective propagation speeds can first be formed for the ROI and then these images can be subdivided into smaller images corresponding to the respective tiles. Alternatively, the ROI can first be subdivided into tiles, and then the smaller images can be reconstructed for each of the tiles and each of the propagation speeds. Method 900 can be used with either order of operations (i.e., reconstruction first and then sub-dividing or sub-dividing first and then reconstruction).

At step 906, a focus metric is applied to the ultrasound images and determining thereby a first accumulated speed that is predicted to optimize the focus metric.

Steps 904 and 906 are performed on a first tile (i.e., a portion of the region of interest) to reconstruct ultrasound images using different speeds of sound for the first tile (step 904) and then based on the images estimate/determine the speeds of sound for the first that optimizes the focus metric (step 906).

At step 908, the process of step 904 is repeated for one or more additional regions within the subject area to generate respective sets of ultrasound images for each of the regions. For each set of ultrasound images, respective images are generated using different trial values for the propagation speed within the region. As the trial propagation speed deviates further from the actual propagation speed, the reconstructed ultrasound image becomes blurrier. Thus, a focus metric can be applied to the set of ultrasound images to estimate the actual propagation speed within the region.

At step 910, the focus metric is applied to each set of ultrasound images to estimate the propagation speed within the region. The ultrasound pulses may propagate through other regions that lie between the transducer and the current region for which the images are being reconstructed. The optimal speed of propagation for these other regions can be determined prior to the current region. Thus, when estimating the propagation speed within the current region, the propagation speed is varied only within the current region. The result of step 910 can be an accumulated speed for ultrasound pulses passing from the transducer to the current region.

Alternatively, the trial propagation speed is applied for all regions lying between the transducer and the current region, as would be the case when the ultrasound image is reconstructed for the entire ROI, and the subdivision into tiles only occurs after the images for the entire ROI have been reconstructed.

At step 912, a regional sound speed map is generated based on the accumulated speeds generated in steps 906 and 910. Certain non-limiting examples of step 912 are described with reference to FIGS. 12A and 12B.

Figure 10A:
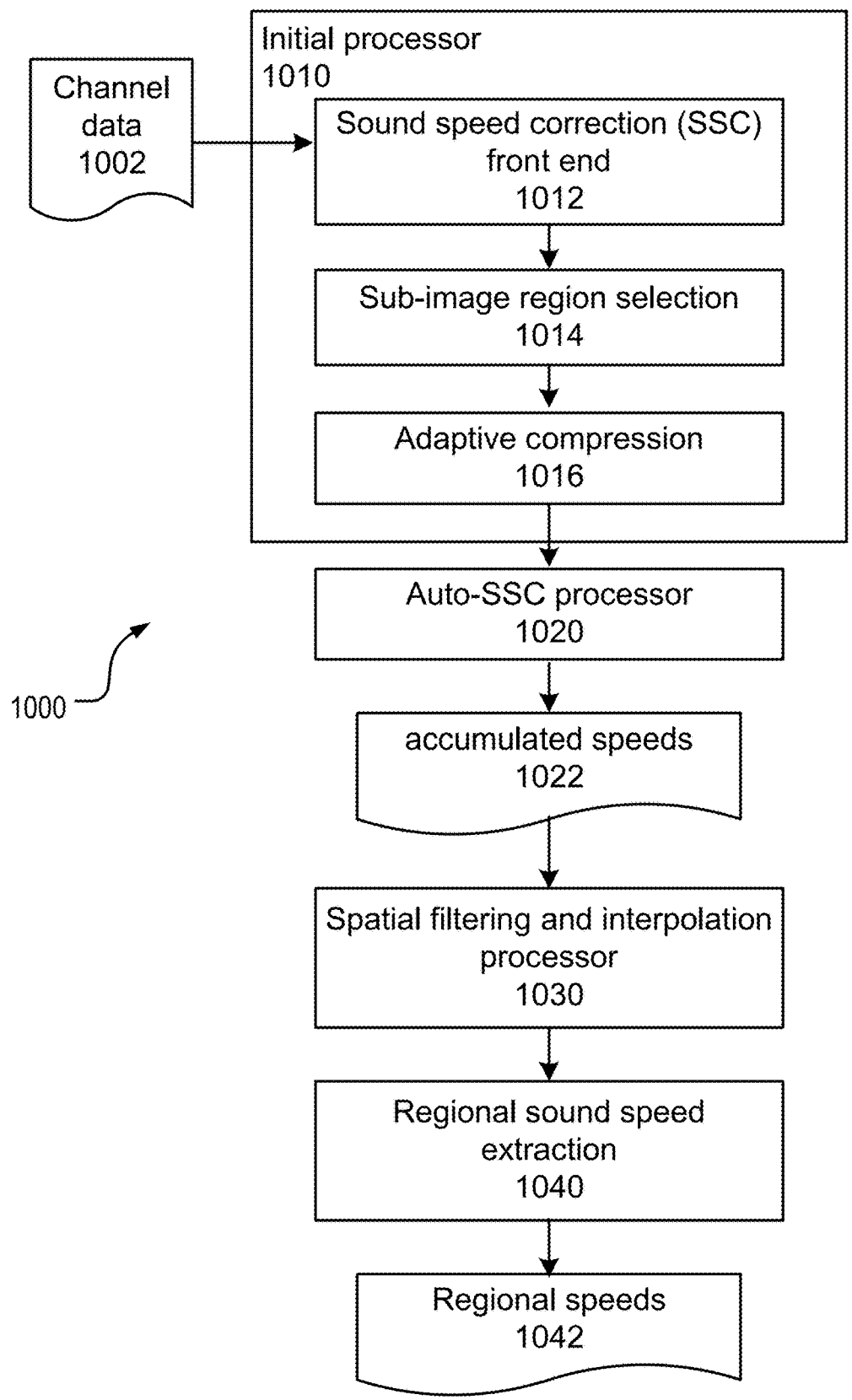
FIG. 10A is a block diagram of a first example system for generating a sound speed map.
Figure 10B:
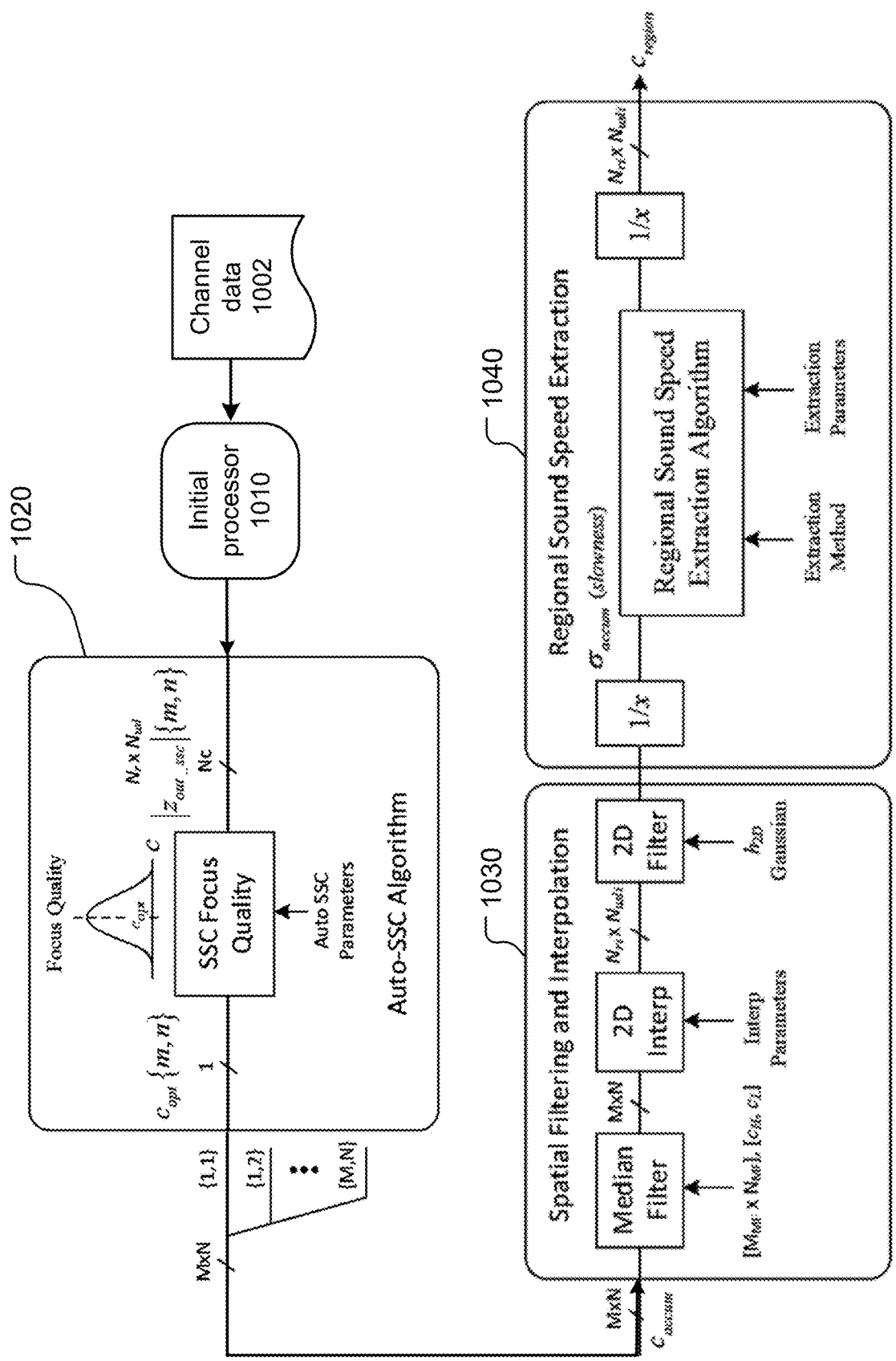
FIG. 10B is a block diagram of a second example system for generating a sound speed map.

FIGS. 10A and 10B illustrate a system 1000 that is configured to perform the steps of method 900. An initial processor 1010 receives channel data 1002 and performs ultrasound image reconstruction for respective tiles within a subject region. The initial process 1010 can include a sound speed correction (SSC) front end 1012, a sub-image region selection unit 1014, and an adaptive compression unit 1016. The initial process 1010 receives channeled data and reconstructs either an image over an entire region of interest (ROI) or breaks the ROI into tiles and reconstructs images over each of the tiles. The tiles may or may not be overlapping. Further, the images can be reconstructed for different trial sound speeds. Here, the disclosure is directed primarily to the implementation of reconstructing images over the respective tiles.

The initial process 1010 can include three subparts: the SSC front end 1012, the sub-image region selection unit 1014, and the adaptive compression unit 1016. The SSC front end 1012 can perform various pre-processing steps such as correcting for detector nonlinearities, applying various calibrations, applying time-gain compensation, transforming from the time-domain to the frequency domain, and applying various filters. For example, B-scan imaging can include synchronizing relative orientation and position.

After pre-processing, the SSC front end 1012 can reconstruct images for the entire ROI or for respective tiles in the ROI. The set of reconstructed images correspond to respective trial propagation speed from a series of trial speeds. Image reconstruction can be performed for the entire ROI or for the subregions, which are described next.

The sub-image region selection unit 1014 divides the ROI into sub-regions or tiles as illustrated in FIG. 11A. This sub-image region selection can be performed before or after reconstructing images for each of the trial propagation speeds.

The adaptive compression unit 1016 provides the ability to softly limit, or compress, the intensity of strong scattering regions within a sub-region tile image in order to equalize the overall signal level in each tile. This may be useful to ensure that the subsequent sound speed estimate is representative of each tile. For example, this soft limit can avoid a case in which the sound speed map is dominated by strong scattering regions within. Compression can be achieved using a non-linear gain curve that is based on a parameter R. The non-linear gain curve enables strong echoes to be modified (e.g., reduced) in relation to weak echoes.

Figure 11B:
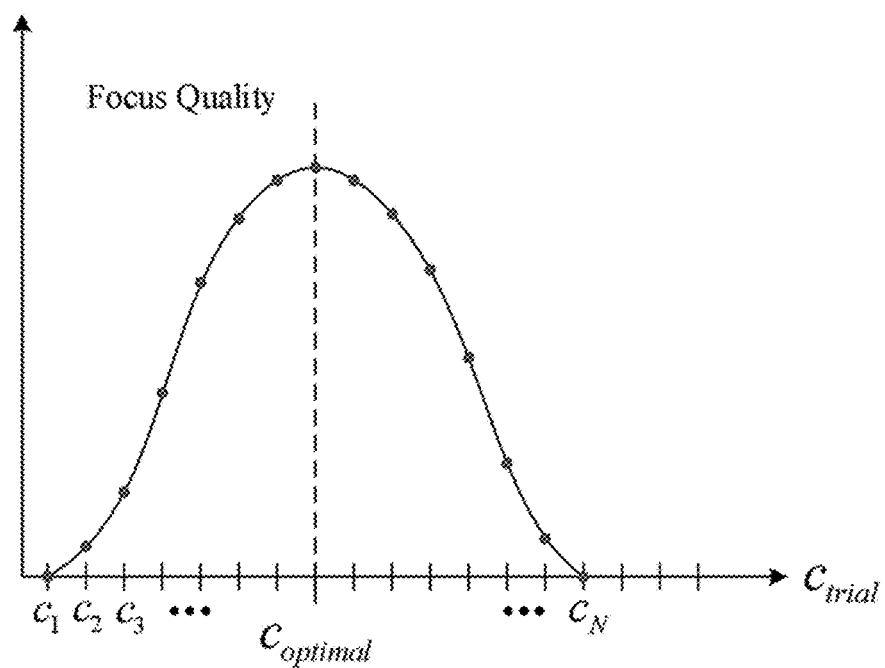
FIG. 11B is a plot of an example of a curve representing a focus quality plotted as a function of a trial sound speed.

The auto-SSC processor 1020 then calculates a focus metric (e.g., a focus quality) that represents the sharpness or contrast of each of the images. The reconstructed image becomes blurrier the further away the trial propagation speed is from the actual propagation speed. Thus, actual propagation speed can be estimated as the propagation speed that optimizes the focus metric for the reconstructed images. This estimation process of the propagation speed that optimizes the focus metric is illustrated in FIG. 10B as a bell curve for the focus quality as a function of the trial propagation speed. Thus, the actual sound speed can be estimated by finding the centroid of the focus quality as a function of the trial sound propagation speeds, as illustrated in FIG. 11B. In FIG. 10B, $|z_{out\_ssc}|\{m, n\}$ represents the reconstructed image for the $m^{th}$ tile in the $n^{th}$ column, where there are a total of M rows and N columns for a total of M×N tiles. The value $c_{opt}\{m, n\}$ from the auto-SSC processor 1020 is the optimal accumulated sound speed 1022 for the tile in the $m^{th}$ row and the $n^{th}$ column. These accumulated speeds 1022 are received by the spatial filtering and interpolation processor 1030, which provides spatial filtering and interpolation. In the non-limiting example illustrated in FIG. 10B, a median filter is applied to the accumulated speeds 1022, and the result is up-sampled using two-dimension (2D) interpolation followed by the 2D Gaussian filter with an impulse response function of $h_{2D}$. The up-sampling enables the final sound speed map to have finer spatial sampling compared to just the tile estimates.

The result from the spatial filtering and interpolation processor 1030 is then processed by the regional sound speed extraction processor 1040 to generate the regional sound speeds 1042 that form the sound speed map. In the non-limiting example illustrated in FIG. 10B, the accumulated sound speeds $c_{accum}$ are inverted to provide values $\sigma_{accum}$ that represent the accumulated slowness. A regional sound speed extraction algorithm is then performed on the accumulated slowness values $\sigma_{accum}$ to generate regional slowness values, which are then inverted to generate the regional sound speeds for the sound speed map.

FIG. 11A illustrates a transducer 1110 that transmits ultrasound pulses into a subject 1120 (e.g., a patient) that includes ROI 1130 for imaging, and the ROI 1130 has been subdivided into tiles 1140, which may or may not be overlapping. The images for different trial speeds of propagation can be generated for the entire ROI 1130, and then the reconstructed images can be subdivided into tiles 1140. Alternatively, the ROI 1130 can be subdivided into tiles 1140 and then images can be reconstructed for each tile using the different trial speeds of propagation. In this case, the optimal speed can be determined first for those tiles closest to the transducer 1110, and then for those tiles 1140 that a progressively farther from the transducer 1110. For example, when propagating to the regions that are farther from the transducer, the ultrasound pulses will pass through the regions closer to the transducer. Thus, the optimal propagation speed for the regions closer to the transducer can be determined first, and then the optimal propagation speed for the closer regions can be used when trying different propagation speeds in the farther regions.

FIG. 11B illustrates an example curve generated for the focus quality as a function of the trial propagation speed. Here, the optimal propagation speed is estimated as the centroid of the curve. Other techniques based on the curve can be used to estimate the optimal propagation speed. For example, the estimate can be based on the median, mean, or mode of the curve. The estimate can be based on curve fitting in which a functional form (e.g., a parabola, a statistical distribution curve such as a Gaussian distribution, or a probability density function) is fit to the experimental values of the focus quality to minimize an error function (e.g., using a least squares error function) between the functional form and the experimental values of the focus quality. The resultant functional form can then be used to estimate the optimal propagation speed.

Figure 12A:
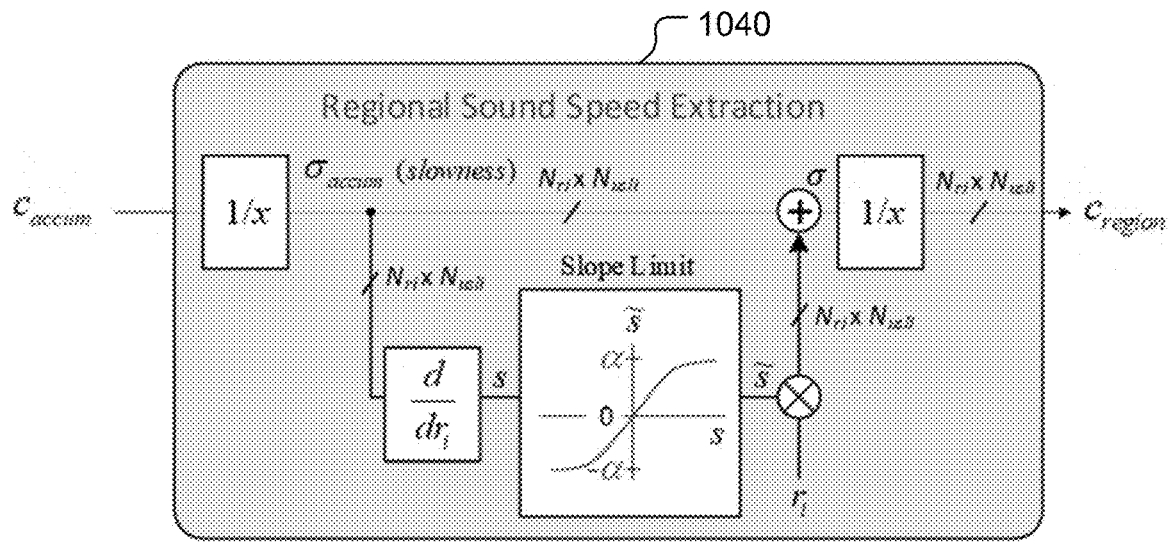
FIG. 12A is a block diagram of a first example of a regional sound speed extraction processor.

FIG. 12A illustrates a first example of the regional sound speed extraction processor 1040. As discussed above, the accumulated sound speeds $c_{accum}$ are inverted to provide values $\sigma_{accum}$ that represent the accumulated slowness. A regional sound speed extraction algorithm is then performed on the accumulated slowness values $\sigma_{accum}$ to generate regional slowness values, which are then inverted to generate the regional sound speeds $c_{region}$ for the sound speed map.

That is, the accumulated slowness values $\sigma_{accum}$ is generated according to the expressions $$T = \frac{r}{c_{accum}(r)} = \int_0^r \frac{1}{c(r')}dr'. \quad \sigma_{accum}(r) = \frac{1}{c_{accum}(r)}.$$

$$\sigma(r) = \frac{1}{c(r)} \quad \sigma_{accum}(r) = \frac{1}{c_{accum}(r)}$$

$$\sigma_{accum}(r) = \frac{1}{r}\int_0^r \frac{1}{c(r')}dr' = \frac{1}{r}\int_0^r \sigma(r')dr'$$

$$\frac{d\sigma_{accum}(r)}{dr} = \frac{\sigma(r)}{r} - \frac{1}{r^2}\int_0^r \sigma(r')dr' = \frac{\sigma(r) - \sigma_{accum}(r)}{r}$$

$$\therefore \sigma(r) = \sigma_{accum}(r) + r\frac{d\sigma_{accum}(r)}{dr}$$

The slope of the accumulated slowness values is then determined according to the expression $$s(r_i) = \frac{d}{dr_i}\sigma_{accum}(r_i).$$

A slope limit is applied to map large values of the slope to smaller values, while values near the zero intercept are maintained near their original value by using an approximately linear mapping. This is to prevent large slopes causing rapid and potentially extraneous exclusions in the subsequent sound speed map. For example, the slope limit can be applied according to the expression $$\hat{s}(r_i) = \alpha \text{sgn}[s(r_i)] \cdot \left(1 - \exp\left(\frac{|s(r_i)|}{\alpha}\right)\right),$$

wherein $\alpha$ is a constant. The regional slowness values $\sigma_{region}$ can then be generated according to the expression $$\sigma_{region}(r_i) = \sigma_{accum}(r_i) + r_i \hat{s}(r_i) = \alpha \operatorname{sgn}[s(r_i)] \cdot \left(1 - \exp\left(\frac{|s(r_i)|}{\alpha}\right)\right),$$

which is then inverted to obtain the regional sound speeds $c_{region}$, i.e., $$c_{region}(r) = \frac{1}{\sigma_{region}(r)}.$$

Figure 12B:
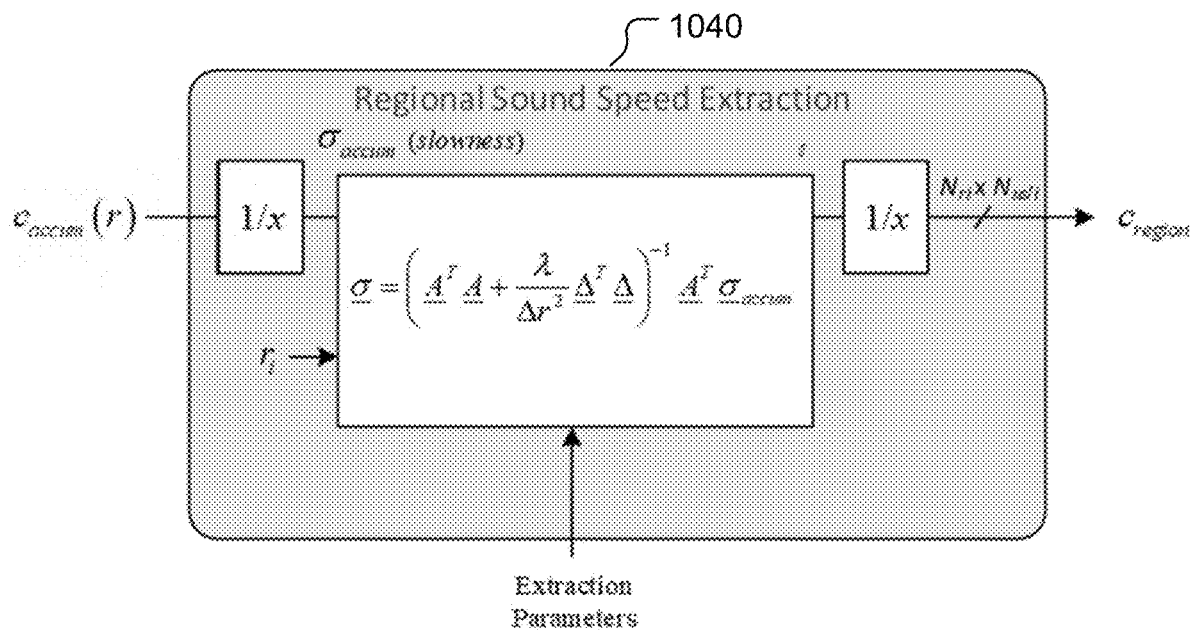
FIG. 12B is a block diagram of a second example of a regional sound speed extraction processor.

FIG. 12B illustrates a second example of the regional sound speed extraction processor 1040. As discussed above, the accumulated sound speeds $c_{accum}$ are inverted to provide values $\sigma_{accum}$ that represent the accumulated slowness. A regional sound speed extraction algorithm is then performed on the accumulated slowness values $\sigma_{accum}$ to generate regional slowness values, which are then inverted to generate the regional sound speeds $c_{region}$ for the sound speed map.

Whereas the first example of processor 1040 can be viewed as a differential approach, the second example of processor 1040 can be viewed as an integral approach, which has been discretized to be expressed as a matrix equation. That is, the time delay for an ultrasound pulse to travel from the transducer (defined as location 0) to the location r of a given sub-image region in the ROI can be expressed as $$T = \frac{r}{c_{accum}(r)} = \int_0^r \frac{1}{c(r')} dr'.$$

Therefore, the accumulated slowness values $\sigma_{accum}$ can be represented as $$\sigma_{accum}(r) = \frac{1}{r} \int_0^r \sigma(r') dr'.$$

The sound speed map can model the sound speed (and the slowness values) as being piecewise constant over respective regions (e.g., squares in a grid). Thus, the integral can be represented as a sum over the discrete slowness values for the sub-regions that are traversed while propagating from the transducer to the location r. This discretization of the integral equation can be performed by breaking up the integral into multiple shorter line integrals for segments of the traversal path each segment corresponding to the respective sub-image region being traversed along the line integral. For example, when an initial traversed region (also referred to as the zeroth region) has a slowness value $\sigma_0$ and extends from 0 to $r_0$, the integral can be rewritten as $$\sigma_{accum}(r) = \frac{1}{r}\int_0^r \sigma(r')dr' = \frac{1}{r}\int_0^{r_0} \sigma(r')dr' + \frac{1}{r}\int_{r_0}^r \sigma(r')dr'$$

$$\sigma_{accum}(r) = \frac{r_0}{r}\sigma_0 + \frac{1}{r}\int_{r_0}^r \sigma(r')dr'.$$

As illustrated in FIG. 11A, the zeroth region can be a portion of the subject 1120 between the transducer 1110 and the ROI 1130. The ROI 1130 is subdivided into sub-image regions that each having the same dimensions (e.g., being defined by a uniform grid), with characteristic size $\Delta r$. In this case the remaining integral can be approximated as a summation $$\int_{r_0}^r \sigma(r')dr' \approx \sum_{m=1}^n \sigma_m \Delta r,$$

wherein $\sigma_m$ is the slowness value of the $m^{th}$ region traversed by the ultrasound pulse as it propagates to location r, and the distance traversed in each sub-image region is $\Delta r$. Similar to the first example, the sub-image regions of the ROI in the sound speed map can be a different size than the tiles used when determining the focus quality. For example, the sub-image regions used for the regional sound speed map can be smaller (e.g., up-sampled) relative to the tiles used when determining the focus quality.

In view of the above, the accumulated slowness for a given region n located at $r_n$ can be expressed as $$\sigma_{accum}(r_n) \approx \frac{r_0}{r_n}\sigma_0 + \frac{1}{r_n}\sum_{m=1}^n \sigma_m \Delta r.$$

Rearranging terms generates the following expression $$\sigma_{accum}(r_n) - \frac{r_0}{r_n}\sigma_0 = \frac{1}{r_n}\sum_{m=1}^n \sigma_m \Delta r,$$

which can be rewritten as a matrix equation in terms of a distance vector $\underline{r}=[r_1, r_2, r_3, \ldots r_N]^T$, a regional slowness vector $\underline{\sigma}=[\sigma_1, \sigma_2, \sigma_3, \ldots \sigma_N]^T$, and an accumulated slowness vector $\underline{\sigma}=[\sigma_{accum}(r_1), \sigma_{accum}(r_2), \ldots \sigma_{accum}(r_M)]^T$, which does not have to be the same dimension as the previous two vectors. For example, the integral equation can be expressed by the matrix equation $$\underline{\sigma}_{accum}(\underline{r}) - \frac{r_0}{\underline{r}}\sigma_0 = \underline{A}\underline{\sigma}(\underline{r}),$$

wherein $\underline{A} = \frac{\Delta r}{\underline{r}} .* \begin{bmatrix} 1 & 0 & 0 & \ldots & 0 \\ 1 & 1 & 0 & \ldots & 0 \\ 1 & 1 & 1 & \ldots & 0 \\ \vdots & \vdots & \vdots & \ddots & \vdots \\ 1 & 1 & 1 & \ldots & 1 \end{bmatrix}$ and $\underline{r} = \begin{bmatrix} r_1 \\ r_2 \\ r_3 \\ \vdots \\ r_N \end{bmatrix}$.

where $1/\underline{r}$ is the reciprocal vector $\underline{r}$ and the expression ".*" indicates element-wise multiplication as applied in MATLAB (e.g., here, element-wise multiplication is a function in which a vector is multiplied element-wise times each column in a matrix). By defining $$\underline{y} = \underline{\sigma}_{accum}(\underline{r}) - \frac{r_0}{\underline{r}}\sigma_0,$$

the matrix equation simplifies to $\underline{y}=\underline{A}\underline{\sigma}$. Based on this matrix equation, an objective/optimization function can be generated, and the slowness values for the sound speed map can be solved for by minimizing the objective function. For example, the objective function can include a data fidelity term and a regularization term. According to certain non-limiting examples, the objective function can be $$O(\underline{y},\underline{\sigma})=\ell^P(\underline{y}-\underline{A}\underline{\sigma})+R(\underline{\sigma}),$$

wherein the data fidelity term is the $L^P$ norm of the data term ($\underline{y}-\underline{A}\underline{\sigma}$) and $R(\underline{\sigma})$, is the regularization term. The objective function is then minimized by solving the expression $$\min_{\underline{\sigma}}\{O(\underline{y},\underline{\sigma})\}.$$

For example, the $L^P$ norm can be the $L^2$ norm (i.e., for least squares optimization) and the Tikhonov regularization can be used, in which case the objective function becomes $$O(\underline{y},\underline{\sigma}) = \|\underline{y}-\underline{A}\underline{\sigma}\|^2 + \frac{\lambda}{\Delta r^2}\|\underline{\Delta}\underline{\sigma}\|^2,$$

wherein $\underline{\Delta} = \begin{bmatrix} 1 & -1 & 0 & 0 & \ldots & 0 \\ 0 & 1 & -1 & 0 & \ldots & 0 \\ 0 & 0 & 1 & -1 & \ldots & 0 \\ \vdots & \vdots & \vdots & \vdots & \ddots & \vdots \\ 0 & 0 & 0 & 0 & \ldots & -1 \end{bmatrix}.$ The solution to this can be expressed as $$\min_{\underline{\sigma}}\left\{\|\underline{y}-\underline{A}\underline{\sigma}\|^2 + \frac{\lambda}{\Delta r^2}\|\underline{\Delta}\underline{\sigma}\|^2\right\} \Rightarrow \underline{\sigma} = \left(\underline{A}^T\underline{A} + \frac{\lambda}{\Delta r^2}\underline{\Delta}^T\underline{\Delta}\right)^{-1}\underline{A}^T\underline{y}$$

Alternatively, the objective function can use the $L^2$ norm and omit the regularization term, in which case the objective function reduces to $$O(\underline{y},\underline{\sigma})=\|\underline{y}-\underline{A}\underline{\sigma}\|^2.$$

The solution to this can be expressed as $$\underline{\sigma}(\underline{A}^T\underline{A})^{-1}\underline{A}^T\underline{y}.$$

The value of $\underline{\sigma}$ that minimizes the objective function can be found using any known method for solving optimization problems, including local optimization methods (e.g., a Nelder-Mead simplex method, a gradient-descent method, a Newton's method, a conjugate gradient method, a shooting method) and global optimization methods (e.g., a stochastic optimization method, a genetic algorithm, a simulated annealing method, a quantum annealing method, a swarm algorithm, an evolutionary algorithm, a random search, etc.).

Figure 13A:
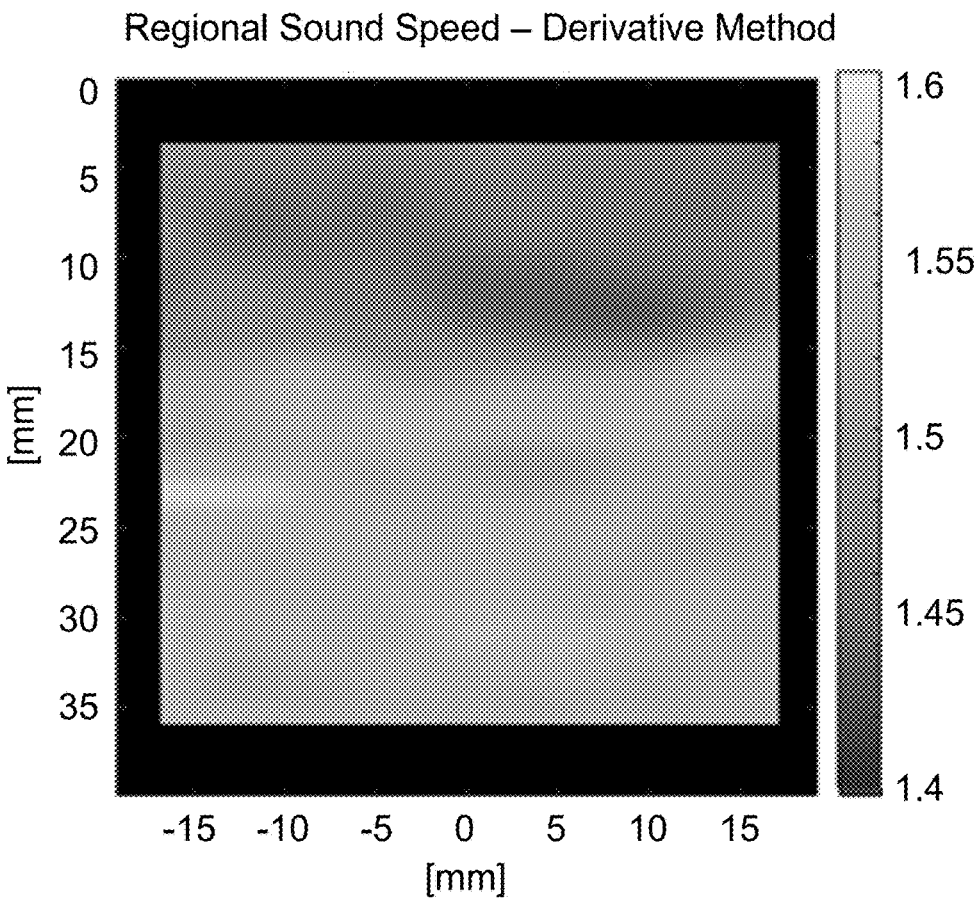
FIG. 13A is a grey-scale map plot of an example of a regional sound speed for a first phantom, when the regional sound speed is generated using the differential equation method.
Figure 13B:
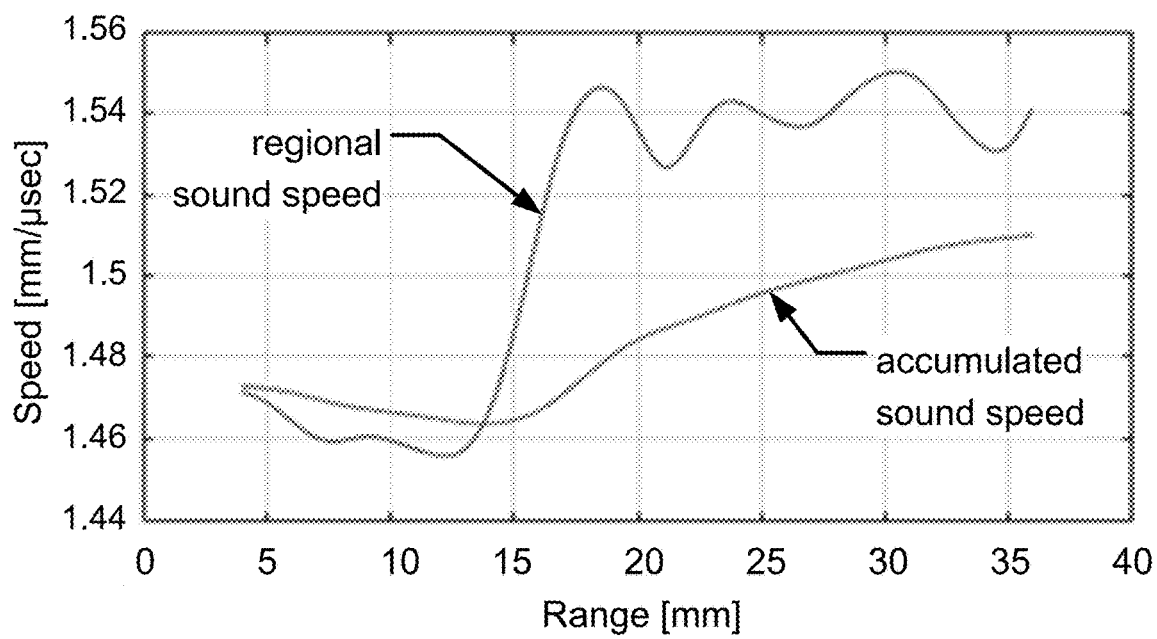
FIG. 13B is a plot of the average sound speed for the first phantom processor as a function of range, when the regional sound speed is generated using differential equation method.

FIGS. 13A and 13B illustrate experimental results using the first technique (i.e., the differential equation method) to generate a sound speed map for a first phantom having a uniform sound speed of about 1.54 mm/μsec at depths of greater than about 15 mm and having a uniform sound speed of about 1.46 mm/μsec at depths of less than about 15 mm. Generally, the derivative technique correctly estimates the sound speed, but exhibits oscillation artifacts near the discrete change of the sound speed at the depth of 15 mm. FIG. 13A shows a grey-scale map reprinting the sound speed as a function of both horizontal and vertical (range) positions. FIG. 13B shows the horizontal averaged sound speed as a function range, including a horizontally averaged accumulated sound speed from the transducer up to the range value.

Figure 14A:
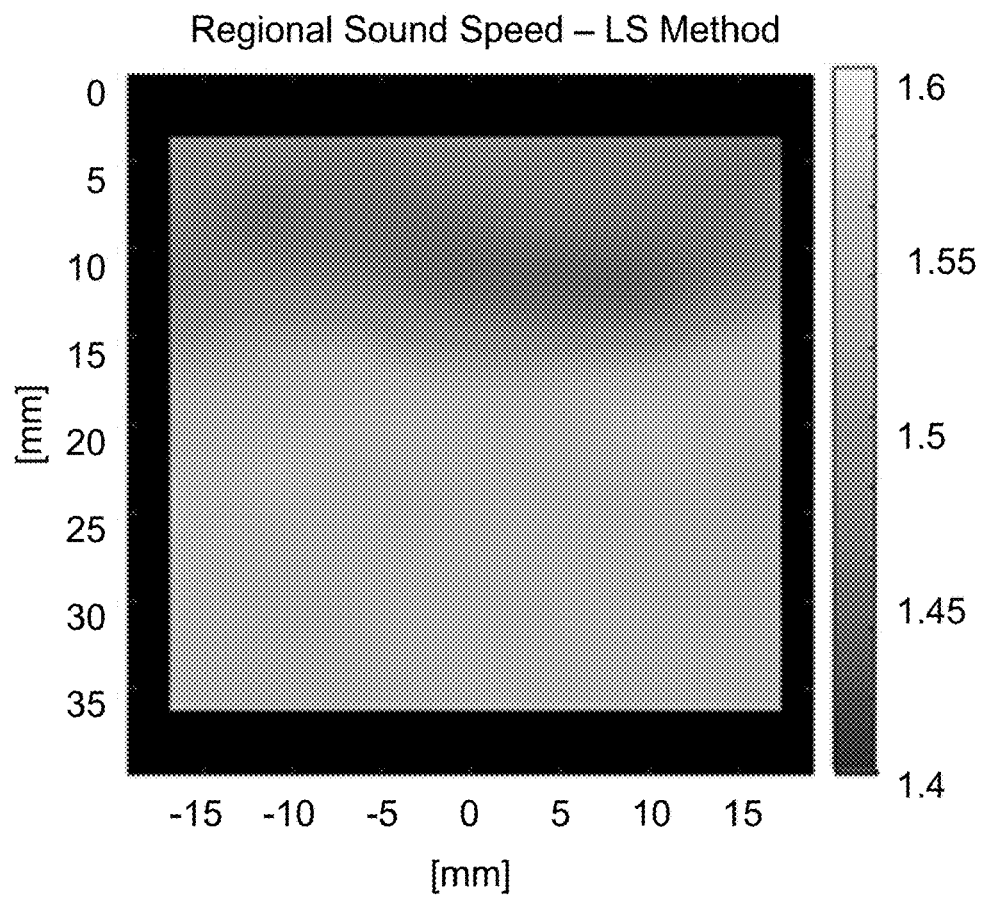
FIG. 14A is a grey-scale map plot of an example of a regional sound speed for a first phantom, when the regional sound speed is generated using a least-squares (LS) method.
Figure 14B:
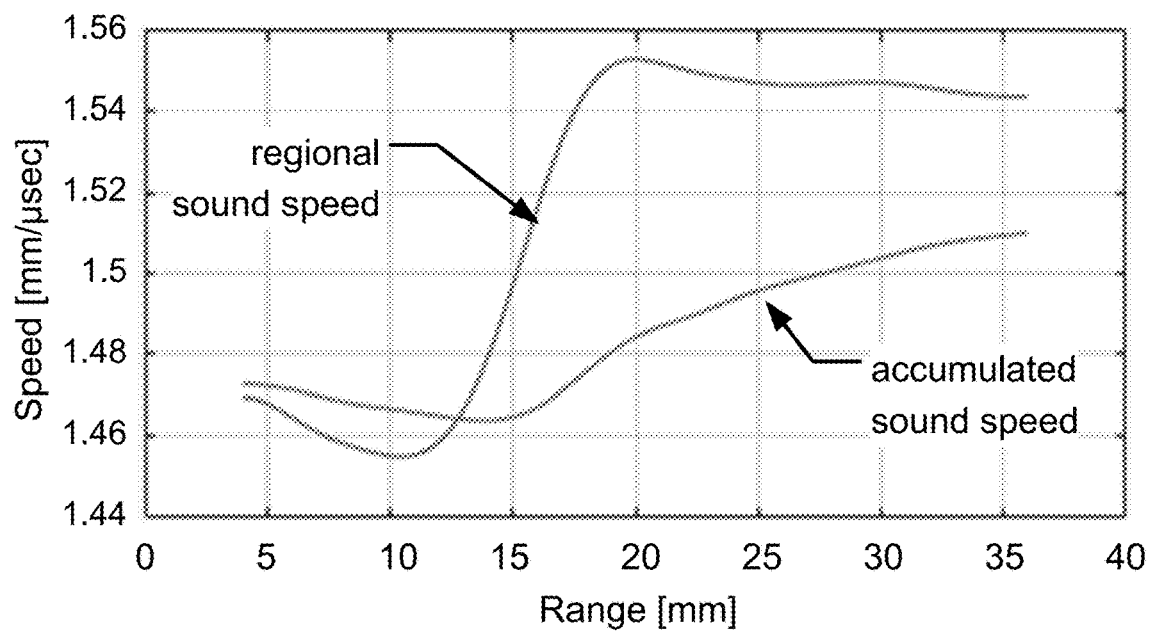
FIG. 14B is a plot of the average sound speed for the first phantom processor as a function of range, when the regional sound speed is generated using the LS method.

FIGS. 14A and 14B illustrate experimental results of a sound speed map for the first phantom that were generated using the second technique with the objective function $$O(\underline{y},\underline{\sigma}) = \|\underline{y}-\underline{A}\underline{\sigma}\|^2 + \frac{\lambda}{\Delta r^2}\|\underline{\Delta}\underline{\sigma}\|^2.$$

Figure 15A:
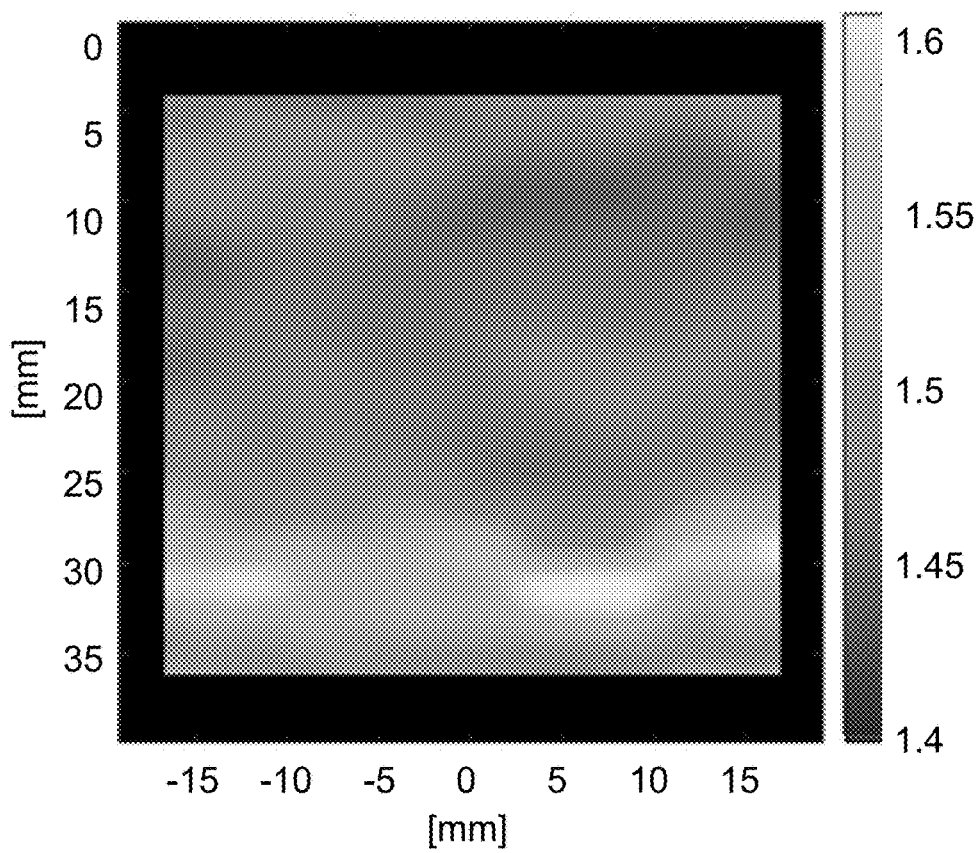
FIG. 15A is a grey-scale map plot of an example of a regional sound speed for a second phantom, when the regional sound speed is generated using the differential equation method.
Figure 15B:
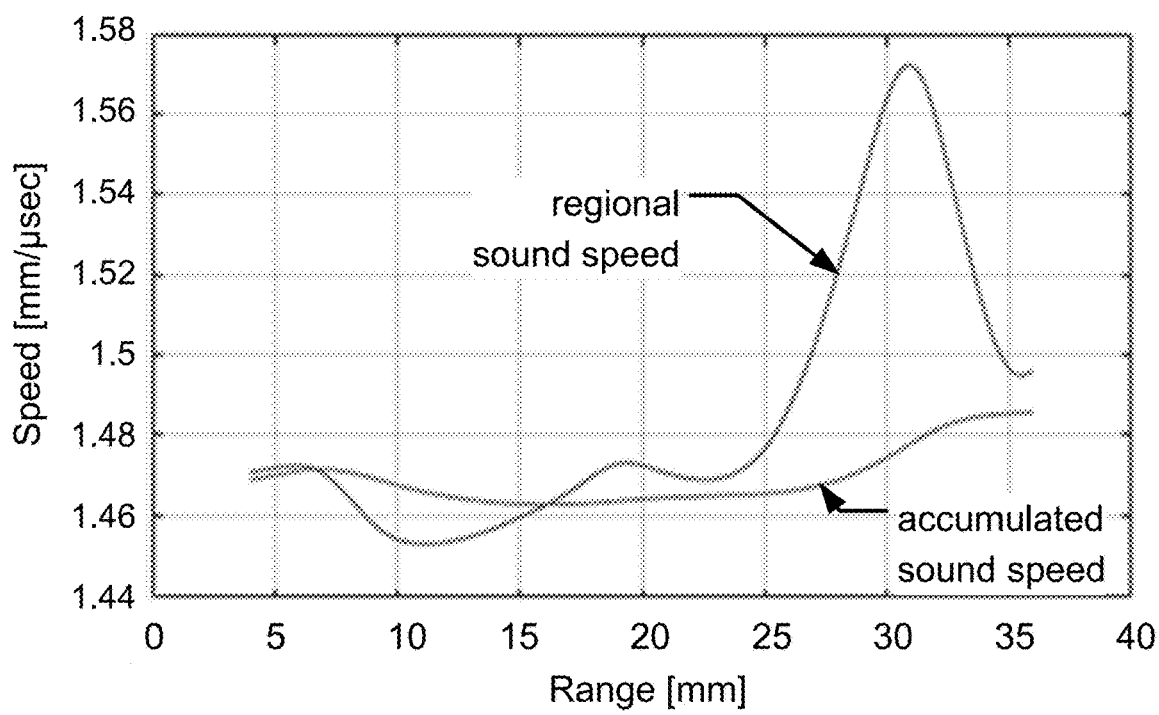
FIG. 15B is a plot of the average sound speed for the second phantom processor as a function of range, when the regional sound speed is generated using the differential equation method.

Generally, this least-squares (LS) technique correctly estimates the sound speed and avoids the oscillation artifacts exhibited using the derivative technique. FIG. 14A shows a grey-scale map reprinting the sound speed as a function of both horizontal and vertical (range) positions. FIG. 14B shows the horizontally averaged sound speed as a function of range, along with the corresponding horizontal averaged accumulated sound speed FIGS. 15A and 15B illustrate experimental results using the differential equation method to generate a sound speed map for a second phantom having a uniform sound speed of about 1.54 mm/μsec at depths of greater than about 27 mm and having a uniform sound speed of about 1.46 mm/μsec at depths of less than about 27 mm. FIG. 15A shows a grey-scale map reprinting the sound speed as a function of both horizontal and vertical (range) positions. FIG. 15B shows the horizontally averaged sound speed as a function range, along with the corresponding horizontally averaged accumulated sound speed.

Figure 16A:
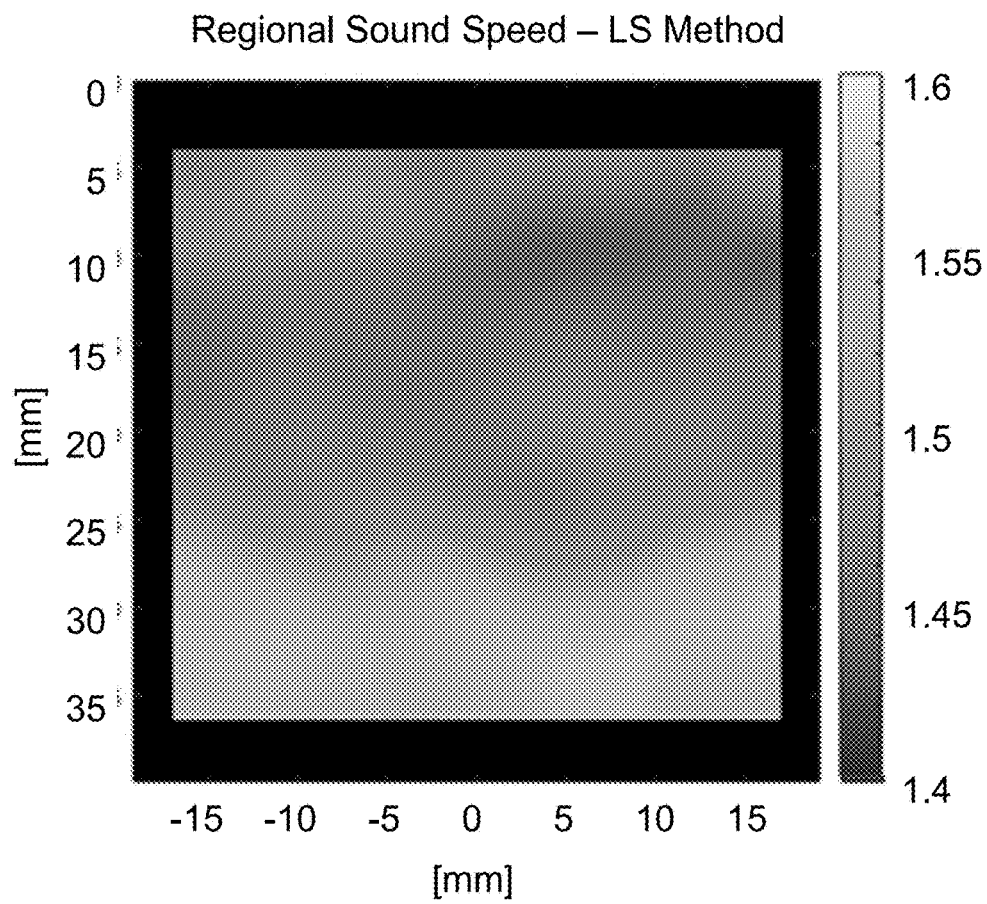
FIG. 16A is a grey-scale map plot of an example of a regional sound speed for a second phantom, when the regional sound speed is generated using the LS method.
Figure 16B:
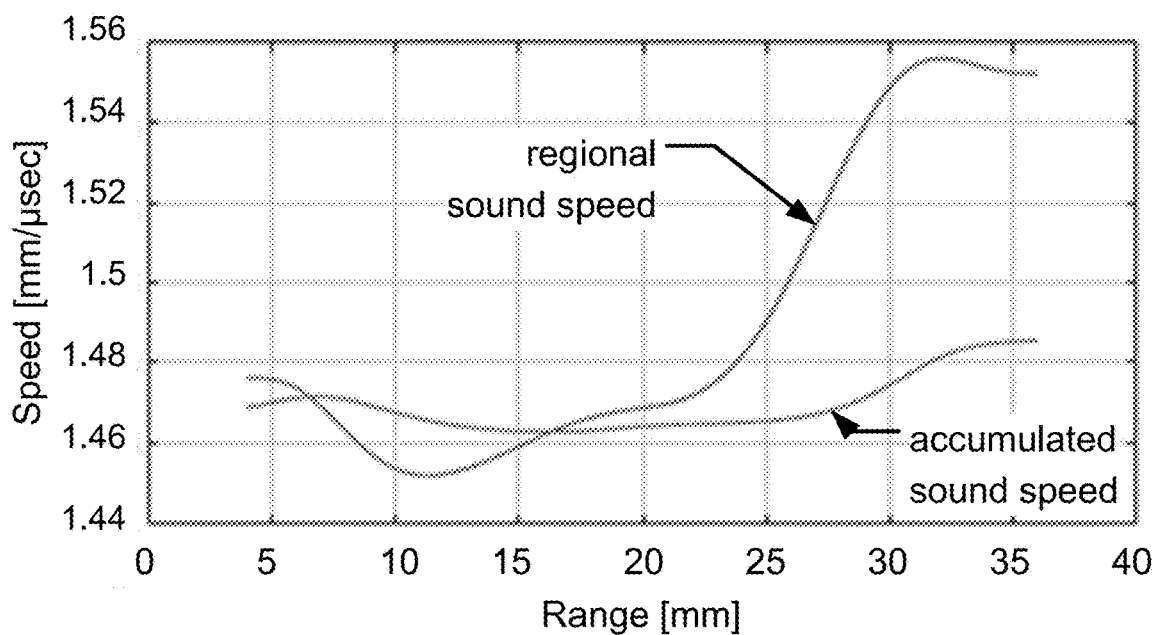
FIG. 16B is a plot of the average sound speed for the second phantom processor as a function of range, when the regional sound speed is generated using the LS method.

FIGS. 16A and 16B illustrate experimental results of a sound speed map for the second phantom that were generated using the LS technique. FIG. 16A shows a grey-scale map reprinting the sound speed as a function of both horizontal and vertical (range) positions. FIG. 16B shows the horizontally averaged sound speed as a function range, along with the corresponding horizontally averaged accumulated sound speed.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

Figure 17:
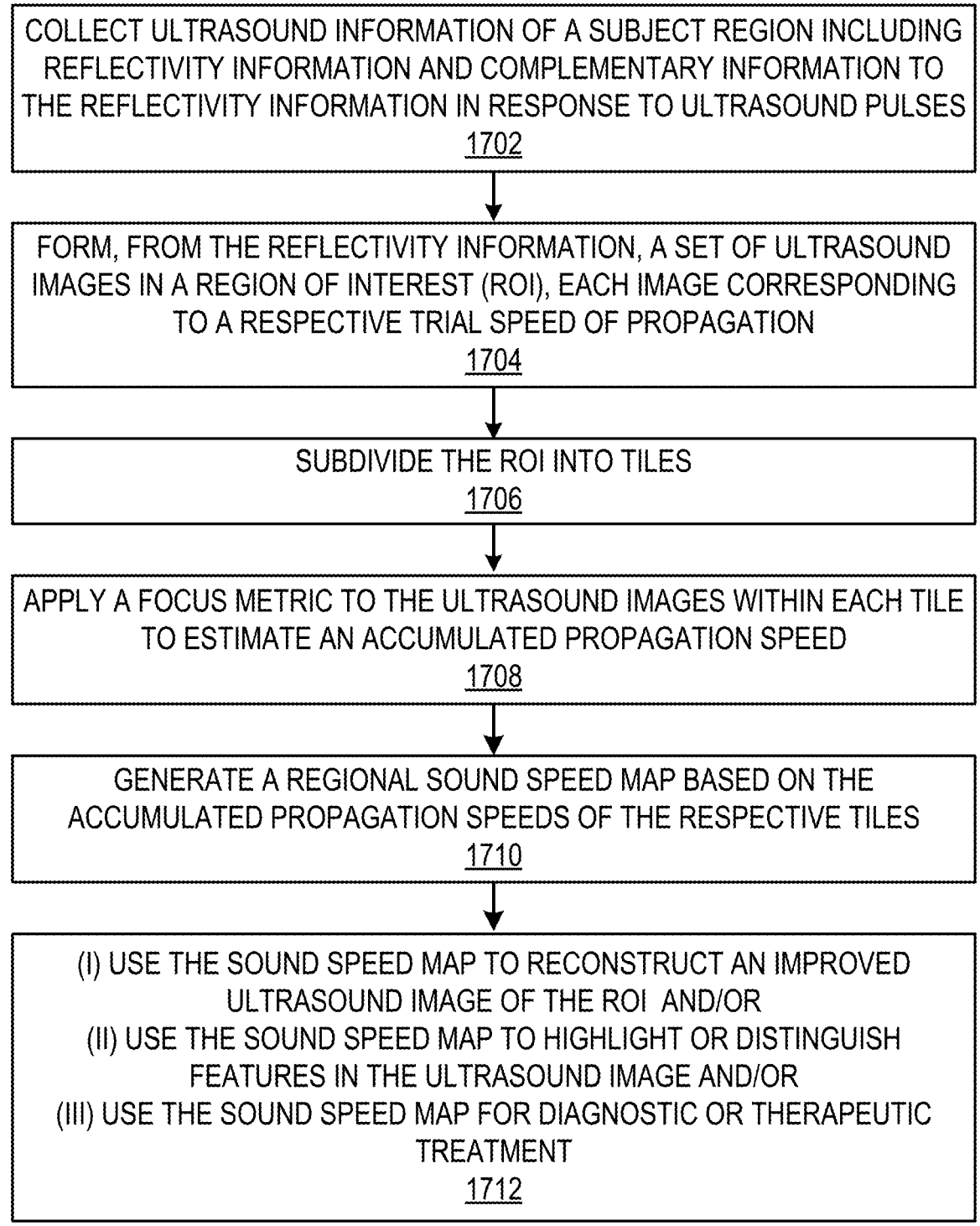
FIG. 17 is a flowchart of an example method for generating and then using a sound speed map.

FIG. 17 illustrates a method 1700 for generating and then using the sound speed map.

In step 1702, ultrasound information of a subject region is collected. The ultrasound information of the subject can include reflectivity information and complementary information to the reflectivity information in response to ultrasound pulses. Step 1702 can be performed according to any of the above examples, such as those examples disclosed with respect to method 200, method 900, or system 1000.

In step 1704, a set of ultrasound images in a region of interest (ROI) is reconstructed from the reflectivity information. Each of these images corresponds to a respective trial speed of propagation. Step 1704 can be performed according to any of the above examples, such as those examples disclosed with respect to method 200, method 900, or system 1000.

In step 1706, the ROI is subdivided into tiles with a set of ultrasound images corresponding to each of the tiles. Step 1706 can be performed according to any of the above examples, such as those examples disclosed with respect to method 900 or system 1000.

In step 1708, a focus metric is applied to the ultrasound images within each tile. The focus metric is used to estimate an accumulated propagation speed corresponding to the tile. Step 1708 can be performed according to any of the above examples, such as those examples disclosed with respect to method 900 or system 1000.

In step 1710, a regional sound speed map is generated based on the accumulated propagation speeds of the respective tiles. Step 1710 can be performed according to any of the above examples, such as those examples disclosed with respect to method 900 or system 1000.

In step 1712, the sound speed map is used in one or more ways, including, e.g.: (i) using the sound speed map to reconstruct an improved ultrasound image of the ROI; using the sound speed map to highlight or distinguish features in the ultrasound image; and/or using the sound speed map for diagnostic or therapeutic treatment.

For example, the sound speed map can be used to enhance the overall contrast resolution of a B-mode image.

Additionally or alternatively, the sound speed map can be used to generate the ultrasound image within the ROI. As discussed, above using the correct sound speeds when reconstructing the ultrasound image has the benefits of reducing artifacts and increasing the sharpness (removing blurriness) of the reconstructed image.

Additionally or alternatively, the sound speed map can itself be displayed to a user of the ultrasound imaging device. This displaying of the sound speed map can be performed separately or together with displaying the ultrasound image. The displayed sound speed map can provide diagnostic and/or clinical information. For example, sound speed map can be used to monitor the progression of therapeutic treatment. Consider that medication or other treatments can change the sound speed of tissue, e.g., by softening the tissue (e.g., in the treatment of liver fibrosis). Changes in the sound speed map over time could indicate whether the medication or treatment are having an affect based on whether the tissue is softening, resulting in a change of sound speed. Additionally, the sound speed map could be useful as supplementary information regarding the treatment of tumors. Even though a tumor has not changed size over time, the tumor may exhibit a change in stiffness, which would be reflected as a change in the sound speed map. This change in the stiffness can have clinical relevance. The information provided by the sound speed map can then be used when determining a course of further treatment.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method for performing ultrasound imaging comprising:
   collecting ultrasound information of a subject region in response to ultrasound pulses transmitted toward the subject region, the ultrasound information including reflectivity information in response to the ultrasound pulses;
   forming, based on the reflectivity information, ultrasound images within a region of interest (ROI), the respective ultrasound images being reconstructed using respective trial propagation speeds;
   determining values of an accumulated speed for respective subregions within the ROI that are calculated to optimize a focus quality for the ultrasound images, wherein the focus quality represents at least one of a sharpness or contrast of each of the ultrasound images; and
   generating a regional sound speed map based on the values of the accumulated speed for the respective subregions;
   wherein generating the regional sound speed map further comprises:
   optimizing an objective function to determine regional sound speeds within respective cells of a grid in the ROI, wherein the objective function includes a data term, the data term including a p-norm ($L^p$) of a difference between the plurality of accumulated slowness values and a product of the regional slowness values and an accumulation matrix, wherein the regional slowness values are reciprocals of the regional sound speeds and the plurality of accumulated slowness values are reciprocals of the plurality of accumulated speeds.

2. The method of claim 1, further comprising:
   forming one or more B-mode ultrasound images of at least a portion of the subject region from the reflectivity information or from additional reflectivity information obtained from an additional set of ultrasound pulses; and
   automatically and selectively adjusting at least one of a gain, a contrast, or brightness level of different portions of the one or more B-mode ultrasound images in relation to each portion's variation from at least one of a mean propagation speed from the regional sound speed map or one or more absolute values of propagation speed from the regional sound speed map to produce one or more contrast-enhanced B-mode ultrasound images.

3. The method of claim 1, further comprising:
displaying the regional sound speed map.

4. The method of claim 1, further comprising:
using the sound speed map to determine or monitor a therapeutic treatment of a tissue within the ROI.

5. The method of claim 1, further comprising:
subdividing the ROI into the subregions; then reconstructing the ultrasound images of the ROI by reconstructing a respective set of ultrasound images corresponding to a respective subregion of the subregions; and applying a focus metric to the set of ultrasound images of the respective subregion to determine the speed of propagation of the respective subregion, wherein the focus metric is applied to subregions closer to a transducer before applying the focus metric to subregions farther from the transducer.

6. The method of claim 1, further comprising:
forming the ultrasound images for all of the ROI, then subdividing each image of the ultrasound images into the subregions to generate image tiles, each of the subregions corresponding to a set of image tiles with each image tile corresponding to a trial propagation speed from a transducer to the subregion corresponding to the subregion; and then applying a focus metric to the set of image tiles corresponding to the subregion to determine the accumulated speed corresponding to the subregion.

7. The method of claim 1, wherein the objective function includes a regularization term that represents a constraint on the regional sound speeds based on expected characteristics of an object being imaged.

8. The method of claim 1, wherein the data term includes an 2-norm ($L^2$) of the difference between the plurality of accumulated slowness values and a product of the regional slowness values and the accumulation matrix, such that the data term represents a least squares error function.

9. The method of claim 1, wherein the grid is up-sampled relative to the sub-regions such that areas of the cells of the grid are smaller than areas of the sub-regions.

10. The method of claim 1, wherein generating a regional sound speed map further comprises:
extracting regional sound speeds for respective cells of a grid in the ROI, the regional sound speeds being extracted using differences between inverses of accumulated speeds for adjacent regions of the plurality of regions to generate first terms.

11. The method of claim 10, wherein the regional sound speeds include an inverse of a sum of the inverses of accumulated speeds with the first terms weighted by a distance between the adjacent regions.

12. The method of claim 11, wherein the first terms are filtered to limit a slope of the regional sound speeds in the regional sound speed map.

13. The method of claim 1, further comprising:
filtering the plurality of accumulated speeds using a low-pass filter as a function of position; and
up-sampling and interpolating the plurality of accumulated speeds onto a grid within the ROI, such that areas of cells of the grid are smaller than areas of the respective sub-regions.

14. A method for performing ultrasound imaging comprising:
collecting ultrasound information of a subject region in response to ultrasound pulses transmitted toward the subject region, the ultrasound information including reflectivity information and sound speed information including propagation speeds of the ultrasound pulses interacting with the subject region;
forming one or more B-mode ultrasound images of at least a portion of the subject region from the reflectivity information;
generating, from the sound speed information, a sound speed map of the propagation speeds of the ultrasound pulses interacting with at least a portion of the subject region; and
automatically and selectively adjusting at least one of a gain, a contrast, or brightness level of different portions of the one or more B-mode ultrasound images in relation to each portion's variation from at least one of a mean propagation speed or one or more absolute values of propagation speed from the sound speed map to produce one or more contrast-enhanced B-mode ultrasound images;
wherein generating the sound speed map comprises:
forming, based on the reflectivity information, ultrasound images within a region of interest (ROI), the respective ultrasound images being reconstructed using respective trial propagation speeds;
determining values of an accumulated speed for respective subregions within the ROI that are calculated to optimize a focus quality for the ultrasound images, wherein the focus quality represents at least one of a sharpness or contrast of each of the ultrasound images; and
generating a regional sound speed map based on the values of the accumulated speed for the respective sub-regions;
wherein generating a regional sound speed map further comprises:
optimizing an objective function to determine regional sound speeds within respective cells of a grid in the ROI, wherein the objective function includes a data term, the data term including a p-norm ($L^p$) of a difference between the plurality of accumulated slowness values and a product of the regional slowness values and an accumulation matrix, wherein the regional slowness values are reciprocals of the regional sound speeds and the plurality of accumulated slowness values are reciprocals of the plurality of accumulated speeds.

15. The method of claim 14, further comprising:
displaying the sound speed map;
using the sound speed map to determine or monitor a therapeutic treatment of a tissue within the ROI; and
reconstructing another ultrasound image of the ROI using the sound speed map.

16. The method of claim 14, wherein generating the sound speed map comprises:
subdividing the ROI into the sub-regions; then reconstructing the ultrasound images of the ROI by reconstructing a respective set of ultrasound images corresponding to a respective sub-region of the sub-regions; and applying a focus metric to the set of ultrasound images of the respective sub-region to determine the speed of propagation of the respective sub-region, wherein the focus metric is applied to sub-regions closer to a transducer before applying the focus metric to sub-regions farther from the transducer.

17. The method of claim 14, wherein generating the sound speed map comprises:

forming the ultrasound images for all of the ROI, then subdividing each image of the ultrasound images into the sub-regions to generate image tiles, each of the sub-regions corresponding to a set of image tiles with each image tile corresponding to a trial propagation speed from a transducer to the sub-region corresponding to the sub-region; and then applying a focus metric to the set of image tiles corresponding to the sub-region to determine the accumulated speed corresponding to the sub-region.

18. The method of claim 14, wherein the objective function includes a regularization term that represents a constraint on the regional sound speeds based on expected characteristics of an object being imaged.

19. The method of claim 14, wherein the data term includes a 2-norm ($L^2$) of the difference between the plurality of accumulated slowness values and a product of the regional slowness values and the accumulation matrix, such that the data term represents a least squares error function.

20. The method of claim 14, wherein the grid is up-sampled relative to the sub-regions such that areas of the cells of the grid are smaller than areas of the sub-regions.

21. The method of claim 14, wherein generating a regional sound speed map further comprises:
extracting regional sound speeds for respective cells of a grid in the ROI, the regional sound speeds being extracted using differences between inverses of accumulated speeds for adjacent regions of the plurality of regions to generate first terms.

22. The method of claim 21, wherein the regional sound speeds include an inverse of a sum of the inverses of accumulated speeds with the first terms weighted by a distance between the adjacent regions.

23. The method of claim 22, wherein the first terms are filtered to limit a slope of the regional sound speeds in the regional sound speed map.

24. The method of claim 14, further comprising:
filtering the plurality of accumulated speeds using a low-pass filter as a function of position; and
up-sampling and interpolating the plurality of accumulated speeds onto a grid within the ROI, such that areas of cells of the grid are smaller than areas of the respective sub-regions.

* * * * *